United States Patent
Mercer et al.

(10) Patent No.: US 8,356,290 B2
(45) Date of Patent: *Jan. 15, 2013

(54) CONVERSION OF A CLASS ORIENTED DATA FLOW PROGRAM WITH INHERITANCE TO A STRUCTURE ORIENTED DATA FLOW PROGRAM

(75) Inventors: Stephen R. Mercer, Austin, TX (US); Akash B. Bhakta, Austin, TX (US); Matthew E. Novacek, Austin, TX (US)

(73) Assignee: National Instruments Corporation, Austin, TX (US)

(*) Notice: Subject to any disclaimer, the term of this patent is extended or adjusted under 35 U.S.C. 154(b) by 932 days.

This patent is subject to a terminal disclaimer.

(21) Appl. No.: 12/430,579

(22) Filed: Apr. 27, 2009

(65) Prior Publication Data
US 2010/0275070 A1 Oct. 28, 2010

(51) Int. Cl.
G06F 9/45 (2006.01)
(52) U.S. Cl. ......... 717/144; 717/132; 717/133; 717/156
(58) Field of Classification Search .................... 717/144
See application file for complete search history.

(56) References Cited

U.S. PATENT DOCUMENTS

| | | | |
|---|---|---|---|
| 6,219,628 B1 | 4/2001 | Kodosky et al. | |
| 6,766,521 B1* | 7/2004 | Bracha et al. | 719/331 |
| 7,143,388 B1* | 11/2006 | Miller et al. | 716/103 |
| 2004/0088685 A1* | 5/2004 | Poznanovic et al. | 717/140 |
| 2006/0036798 A1* | 2/2006 | Dickey et al. | 711/100 |
| 2006/0117302 A1* | 6/2006 | Mercer et al. | 717/131 |
| 2008/0244541 A1* | 10/2008 | Thomson et al. | 717/143 |

* cited by examiner

Primary Examiner — Wei Zhen
Assistant Examiner — Brahim Bourzik
(74) Attorney, Agent, or Firm — Meyertons Hood Kivlin Kowert & Goetzel, P.C.; Jeffrey C. Hood; Mark S. Williams

(57) ABSTRACT

System and method for converting a class oriented data flow program to a structure oriented data flow program. A first data flow program is received, where the first data flow program is an object oriented program comprising instances of one or more classes, and wherein the first data flow program is executable to perform a first function. The first data flow program is automatically converted to a second data flow program, where the second data flow program does not include the instances of the one or more classes, and where the second data flow program is executable to perform the first function. The second data flow program is stored on a computer memory, where the second data flow program is configured to be deployed to a device, e.g., a programmable hardware element, and where the second data flow program is executable on the device to perform the first function.

16 Claims, 16 Drawing Sheets

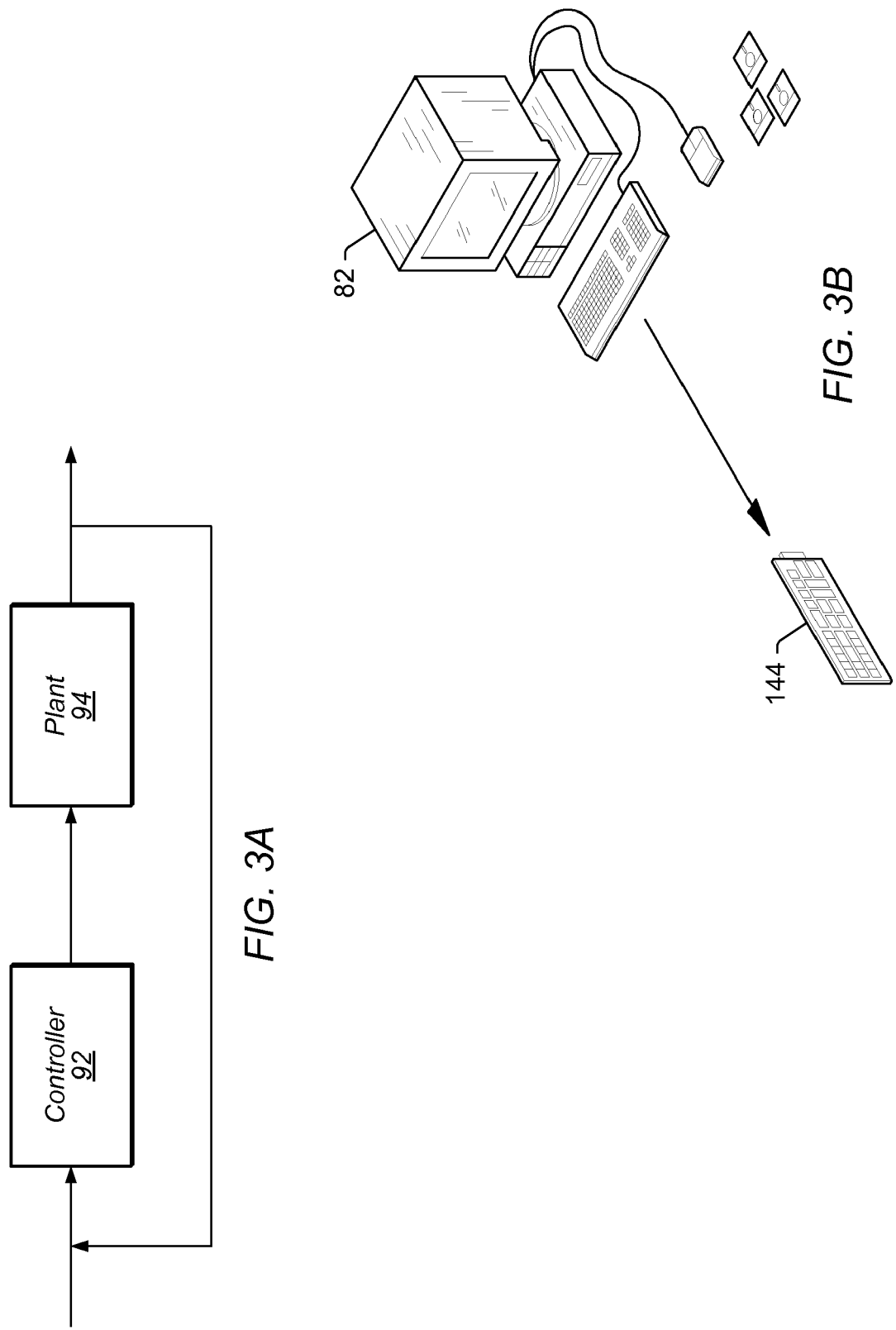

receive a first data flow program, where the first data flow program is executable to perform a first function, and where the first data flow program is an object oriented program that includes instances of one or more classes
502 automatically convert the first data flow program to a second data flow program, where the second data flow program does not include the instances of the one or more classes, and where the second data flow program is executable to perform the first function
504 store the second data flow program on a computer memory, where the second data flow program is configured to be deployed to a device, and where the second data flow program is executable on the device to perform the first function
506

*FIG. 5* receive a first data flow program, where the first data flow program is executable to perform a first function, and where the first data flow program is an object oriented program that includes instances of one or more classes
502 automatically convert the first data flow program to a second data flow program, where the second data flow program does not include the instances of the one or more classes, and where the second data flow program is executable to perform the first function
504 compile the second data flow program into a hardware configuration program, where the hardware configuration program is configured to be deployed onto a programmable hardware element
606

*FIG. 6*

CONVERSION OF A CLASS ORIENTED DATA FLOW PROGRAM WITH INHERITANCE TO A STRUCTURE ORIENTED DATA FLOW PROGRAM

FIELD OF THE INVENTION

The present invention relates to the field of programming, and more particularly to a system and method for converting a class oriented data flow program to a structure oriented data flow program.

DESCRIPTION OF THE RELATED ART

Software programs and programming have become ubiquitous in the modern world, finding application in virtually all fields, including for example, industrial applications such as automated design, testing, and manufacturing, as well as financial, scientific, and entertainment applications, among others. Many different techniques and tools for programming have been developed, including for example, high level text-based programming languages such as BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

These languages utilize the concept of a data type, in which the raw bits of memory, rather than being handled as a string of zeros and ones, are interpreted as more complex concepts. For example, an arbitrary set of 32 bits may represent any number of concepts, such as: an unsigned integer between 0 and $2^{(32-1)}$, a sequence of four smaller numbers and used as a network address, a pointer to an address in memory, and so forth. By requiring the programmer to declare the intended usage—i.e., the data type—for each piece of memory, the program may limit the actions taken with that piece of memory and thus reduce programming errors.

In the late 1970's and early 1980's, object oriented programming (OOP) was developed, based on the central idea of an object. Prior to development of OOP, the programmer was limited to data types that were built into the language, i.e., primitive and/or intrinsic data types, or defining groups of these built-in types. OOP suggested that the user should not only be able to define the structure of memory, but also define the operations that were legal on that memory. The term "class" came to represent a new kind of data type in which the data and the methods that operated on that data are packaged together. An object in memory is of a particular class type. In current OOP languages, object classes are generally defined by specifying one or more data fields, i.e., member variables, and/or associated functions, i.e., member functions or methods. As with the primitive data types, class types may be intrinsic to a language, though most are user-defined. Further, new class types may be defined by "inheriting" from existing classes, a term known in the art to mean acquiring all the data and methods from an existing class type and then adding new data and/or methods to the new type. Inheritance may also comprise providing alternate behavior for the existing methods, known as function overloading, where a child class defines a function with the same name as one of its parent class functions, and where the child function overrides the parent function.

Examples of OOP languages include Smalltalk, C++, JAVA, and ADA, among others. Additionally, object oriented concepts have also been implemented in other types of languages. For example, National Instruments Corporation provides a data flow object oriented language (LabVIEW) that combines the benefits of data flow programming with classes.

However, object oriented programming generally makes heavy use of dynamic (e.g., runtime) program mechanisms and elements, such as pointers, memory addressing, dynamic memory allocation, memory sharing, dynamic dispatch, and so forth. Such dynamic aspects are problematic in some applications, e.g., programmable hardware, where these mechanisms and elements are not available.

Thus, improved systems and methods for programming are desired.

SUMMARY OF THE INVENTION

Various embodiments of a system and method for converting a class oriented data flow program to a structure oriented data flow program are presented below.

A first data flow program may be received, e.g., on a computer system, where the first data flow program is executable to perform a first function. The first data flow program may be received from an external device, e.g., over a network, or may be created on the computer system. The data flow program is an object oriented program that includes instances, i.e., objects, of one or more classes. Thus, the data flow program may be referred to as a class oriented data flow program. Note that the first data flow program may be graphical or text-based, as desired.

The first data flow program may be automatically converted to a second data flow program, where the second data flow program does not include the instances of the one or more classes, and where the second data flow program is executable to perform the first function. For example, automatically converting the first data flow program to a second data flow program may include converting the instances of the one or more classes to a corresponding one or more structures. Thus, the class oriented data flow program may be converted to a corresponding structure oriented data flow program.

The second data flow program may be stored on a computer memory. The second data flow program may be configured to be deployed to a device, where the second data flow program is executable on the device to perform the first function. More specifically, the second (e.g., structure oriented) data flow program may be configured to be deployed to a device that does not support operations necessary for support of classes. For example, the second data flow program may be deployable to a device that does not support pointers, memory addressing, or dynamic dispatch. An example of such a device is a programmable hardware element, e.g., a field programmable gate array (FPGA), or other device with static resources. Thus, the first data flow program may not be deployable onto a programmable hardware element, whereas the second data flow program, which has been converted to a structure oriented data flow program, may be configured to be deployed onto a programmable hardware element.

In some embodiments, the second data flow program may be deployed to a first device, where the second data flow program is executable on the first device to perform the first function. For example, the second data flow program may be deployed to a programmable hardware element (PHE), e.g., an FPGA. The second data flow program may first be used to generate a corresponding hardware configuration program (HCP), which may then be compiled to a netlist and deployed to the PHE.

In one embodiment, the first data flow diagram may utilize a plurality of classes from a class inheritance hierarchy. In other words, at least one class has at least one ancestor class or at least one descendent class. Thus, each of the structures generated in the second data flow program may include data elements corresponding to data elements of the corresponding class and any ancestor classes. The class-specific structure may be implemented in any of a variety of ways, e.g., a structure of structures, with internal structures corresponding to respective levels in the class's inheritance chain. These internal structures may be nested, or may be contained at the same level. Alternatively, the class-specific structure may simply contain all data elements in the chain at one level, i.e., with no internal structures.

In some embodiments, the first data flow program may not only utilize a plurality of classes from a class inheritance hierarchy, but at least some data types of instances at run-time may not be able to be statically determined. In other words, static determination of data types may not always be possible.

In these embodiments, the first data flow program may be automatically converted to the second data flow program, where, as before, the second data flow program does not include the instances of the one or more classes, but also where the second data flow program is executable to dynamically determine or interpret data types at runtime.

Note that since the first data flow program includes instances of classes in a class hierarchy, and the data type of at least some of the instances cannot be statically determined, the functionality normally provided by dynamic dispatch operations of the programming language may be implemented via additional structure and processing in the second data flow program itself. For example, in some embodiments, the classes include at least one descendant class that has ancestor classes. For at least one instance of a class that can be statically determined to be of a particular class, the converting may include converting the instance to a corresponding structure in the second data flow program that includes data elements corresponding to data elements of the particular class and any ancestor classes, similar to the conversion described above. However, for at least one instance of a class that requires dynamic determination of class type, the converting may include converting the at least one instance to a generic structure for containing all data members of any class and its ancestor classes, i.e., that during operation contains all data members of any class and its ancestor classes. In other words, the generic structure is or can be configured to contain all data members of any class and its ancestor classes. This generic structure facilitates dynamic determination or interpretation of data types at runtime.

For example, in one embodiment, the method may include analyzing (e.g., automatically, i.e., via software) a class hierarchy of the first data flow program to determine a union of data members of the classes in the class hierarchy, and determining the generic structure in the second data flow program based on the determined union. The generic structure is configured to (or can be configured to) store all data members of any class in the class hierarchy of the first data flow program and its ancestor classes. In other words, the generic structure, which may also be referred to as a union structure, may be large enough to represent any class in the class hierarchy. The generic structure may include an enum for denoting a runtime data type of the generic structure, as well as a set of elements sufficient for representing data for any class in the class hierarchy and its ancestor classes. The enum may be set at runtime to denote the data type of the structure as dynamically determined at runtime.

Once these class instances are each replaced with the generic structure, and the enum set to the correct type, during execution of the second data flow program, program logic may dynamically determine how to interpret the generic structure based on the enum value. Dynamic dispatch subprogram calls (e.g., in some graphical program embodiments, subVI calls), instead of being converted or cloned into static subprogram calls, may become case structures that use the enum value to select which of several subprograms to execute.

This generic or union structure may be implemented in various different ways in different embodiments. For example, in one embodiment, the generic structure may include a fixed portion comprising data elements corresponding to data elements of the class and any ancestor classes, and a generic portion for containing (or that contains) all data members of any descendant classes of the class. Note that in this embodiment, there may be multiple generic structures respectively implementing or representing (replacing) a subset of the classes in the hierarchy, where the fixed portion may be dependent upon the corresponding class. Note, however, that in other embodiments, there may be no fixed portion, and so there may be only one type of generic structure used for any and all classes.

Thus, an object oriented, e.g., class oriented, data flow program may be automatically converted to a structure oriented data flow program, which may then be deployed to devices that do not support operations necessary for support of classes, e.g., programmable hardware.

BRIEF DESCRIPTION OF THE DRAWINGS

A better understanding of the present invention can be obtained when the following detailed description of the preferred embodiment is considered in conjunction with the following drawings, in which:

FIG. 3A is a high level block diagram of an exemplary system which may execute or utilize programs, according to one embodiment of the invention;

FIG. 3B illustrates an exemplary system which may perform control and/or simulation functions utilizing programs, according to one embodiment of the invention;

FIG. 5 is a flowchart diagram illustrating one embodiment of a method for converting a class oriented data flow program to a structure oriented data flow program;

FIG. 6 is a flowchart diagram illustrating one embodiment of a method for converting a class oriented data flow program to a structure oriented data flow program for deployment to a programmable hardware element, e.g., an FPGA;

Figure 1A:
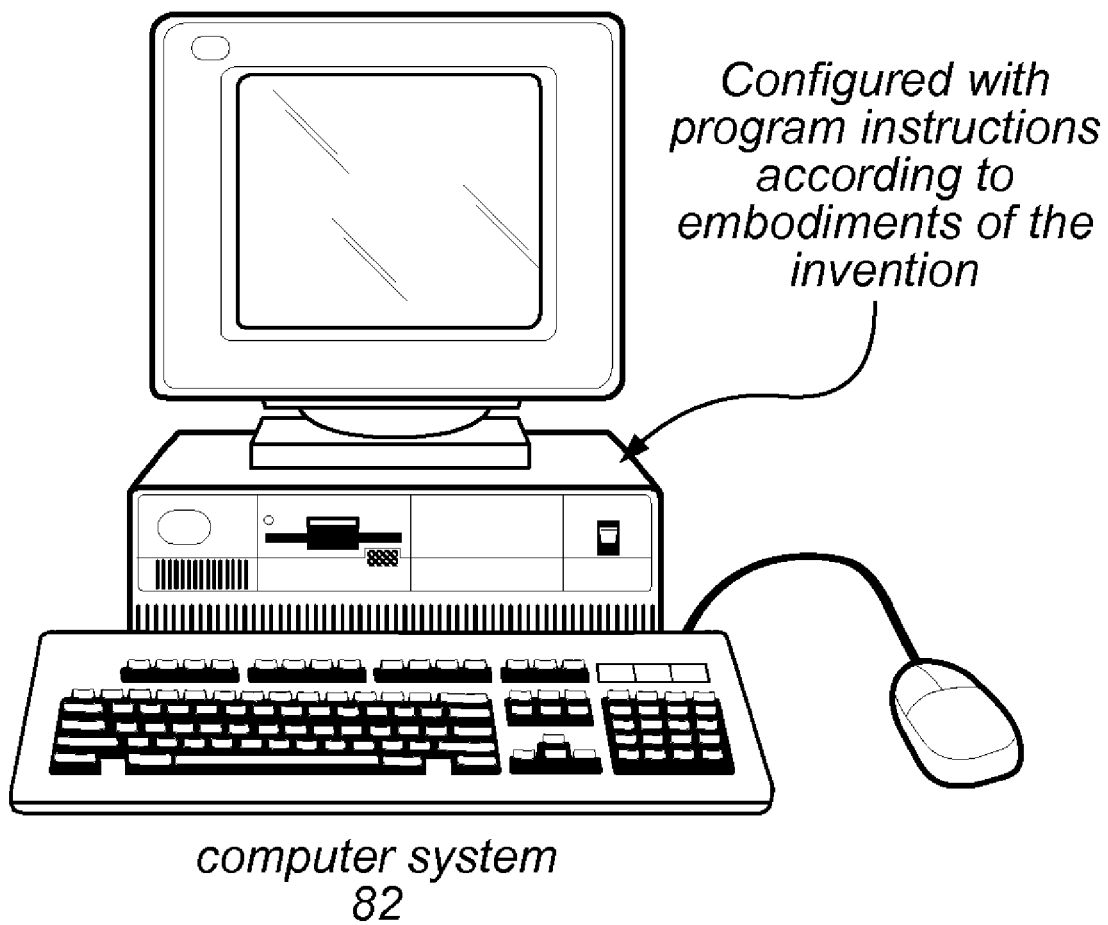
FIG. 1A illustrates a computer system for executing a program, according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 5,905,649 titled "System And Method For Performing Type Checking And Class Propagation Of Attributes In A Graphical Data Flow Program," filed Sep. 23, 1996.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/System- Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program that is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that acquire and/or store data, or are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Class—the term "Class" has the full breadth of its ordinary meaning in object oriented programming, and includes a definition of an object or data structure in object-oriented programming that encapsulates data as member variables and may include methods that operate on the data. An instantiated class is referred to as an instance or object of that class. Some object-oriented languages support class inheritance, whereby classes, i.e., child classes, may be derived from other classes, i.e., parent or ancestor classes, where the child classes include or contain the data variables and methods of its ancestor classes.

FIG. 1A—Computer System

FIG. 1A illustrates a computer system 82 configured to implement embodiments of the present invention. One embodiment of a method for converting a class oriented data flow program to a structure oriented data flow program is described below.

As shown in FIG. 1A, the computer system 82 may include a display device configured to display the data flow program as the program is created, converted, deployed, and/or executed. The display device may also be configured to display a graphical user interface for the program during execution of the program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more (textual or graphical) programs which are executable to perform the methods described herein. The memory medium may store the class oriented data flow program as well as the structure oriented data flow program, either of which may be textual or graphical programs. The memory medium may also store program instructions which are executable to perform the conversion method and other operations described herein. For example, the memory medium may store a programming development environment application used to create, convert, deploy and/or execute such programs. The memory medium may also store operating system software, as well as other software for operation of the computer system. Various embodiments further include receiving or storing instructions and/or data implemented in accordance with the foregoing description upon a carrier medium.

Figure 1B:
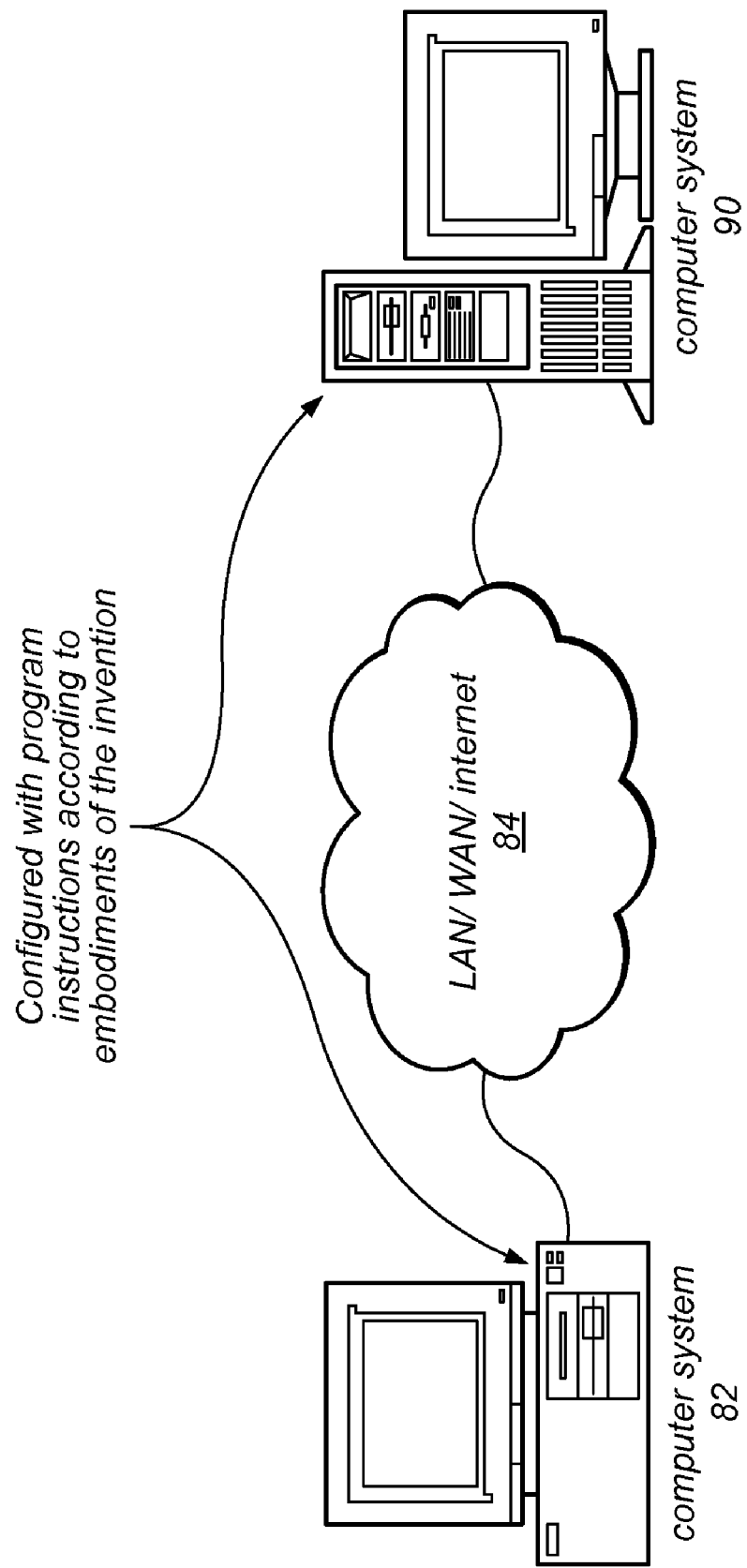
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, in embodiments where the data flow program is a graphical data flow program that includes a block diagram, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program. In one embodiment where the data flow program is a graphical data flow program, the graphical user interface of the graphical program may be displayed on a display device of the computer system 82, and the block diagram may execute on a device coupled to the computer system 82.

More generally, the converted data flow program (or a portion thereof) may be deployed to such a device for execution or operation. The device may include a programmable hardware element, e.g., a field programmable gate array (FPGA), and/or may include a processor and memory medium which may execute a real time operating system. In one embodiment, the data flow program may be downloaded and executed on the device. For example, an application development environment with which the program is associated may provide support for downloading a program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the data flow program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
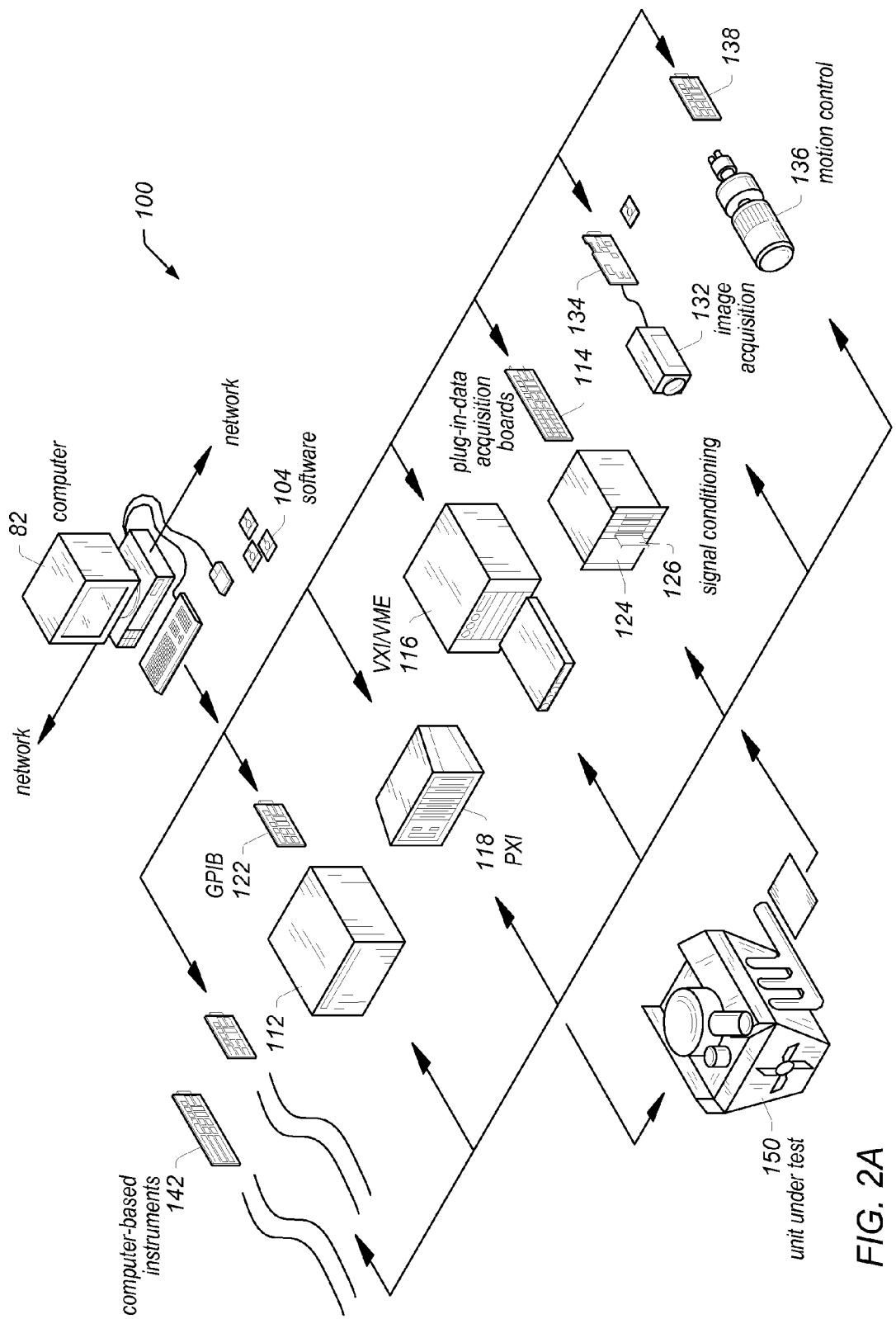
FIG. 2A illustrates an instrumentation control system, according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
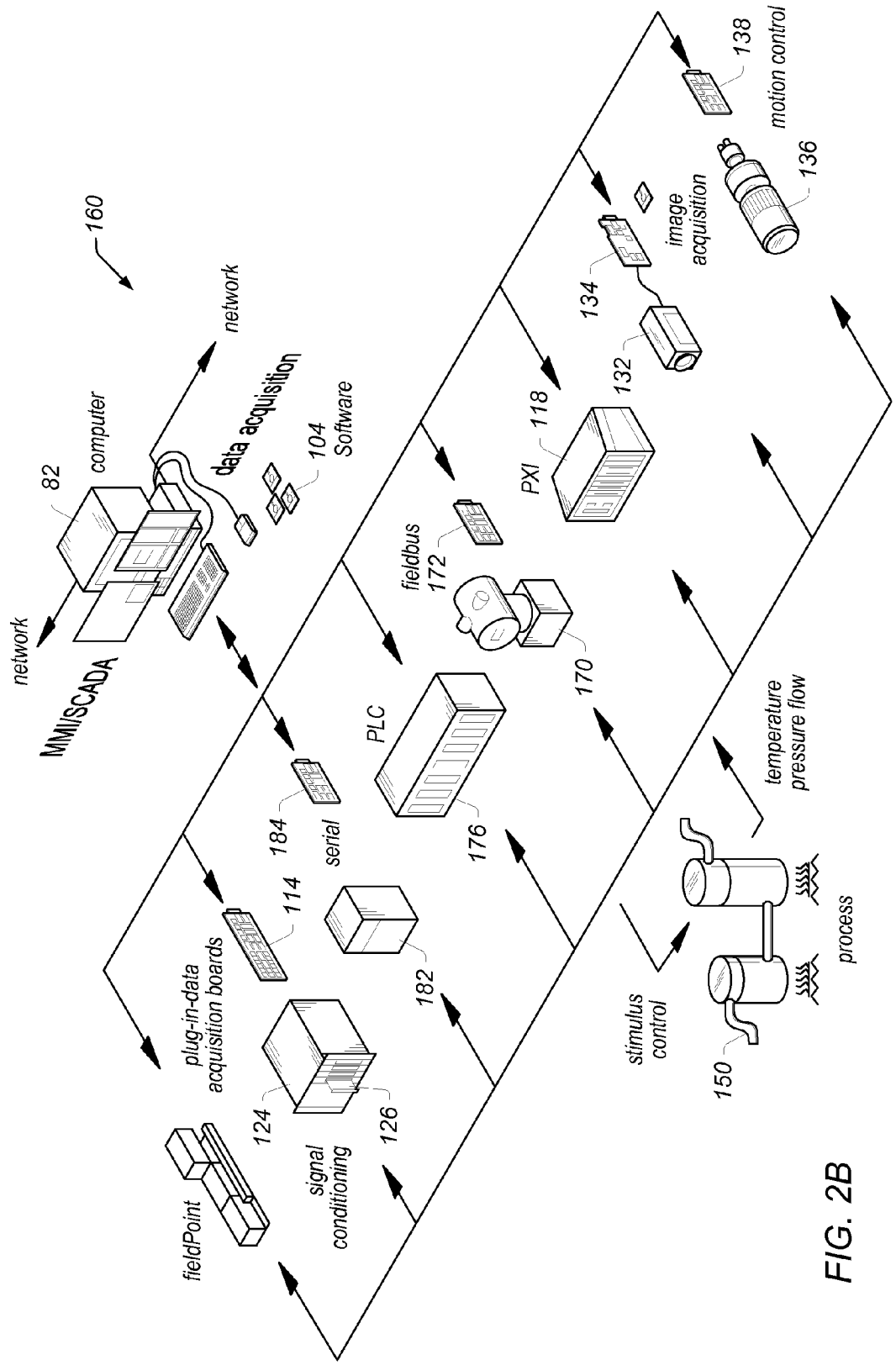
FIG. 2B illustrates an industrial automation system, according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

FIG. 3A is a high level block diagram of an exemplary system which may execute or utilize data flow programs according to embodiments disclosed herein. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a data flow program that specifies or implements the functionality of one or both of the controller 92 and the plant 94. For example, a control engineer may use a modeling and simulation tool to create a model (program) of the plant 94 and/or to create the algorithm (program) for the controller 92.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a data flow program as described herein. In a similar manner, the plant 94 may be implemented by a computer system or other device 144 (e.g., including a processor and memory medium and/or including a programmable hardware element) that executes or implements a data flow program, or may be implemented in or as a real physical system, e.g., a car engine.

In one embodiment of the invention, one or more data flow programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a data flow program, and the data flow program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more data flow programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a data flow program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a data flow program on a computer and use (execute) the data flow program on that computer or deploy the data flow program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
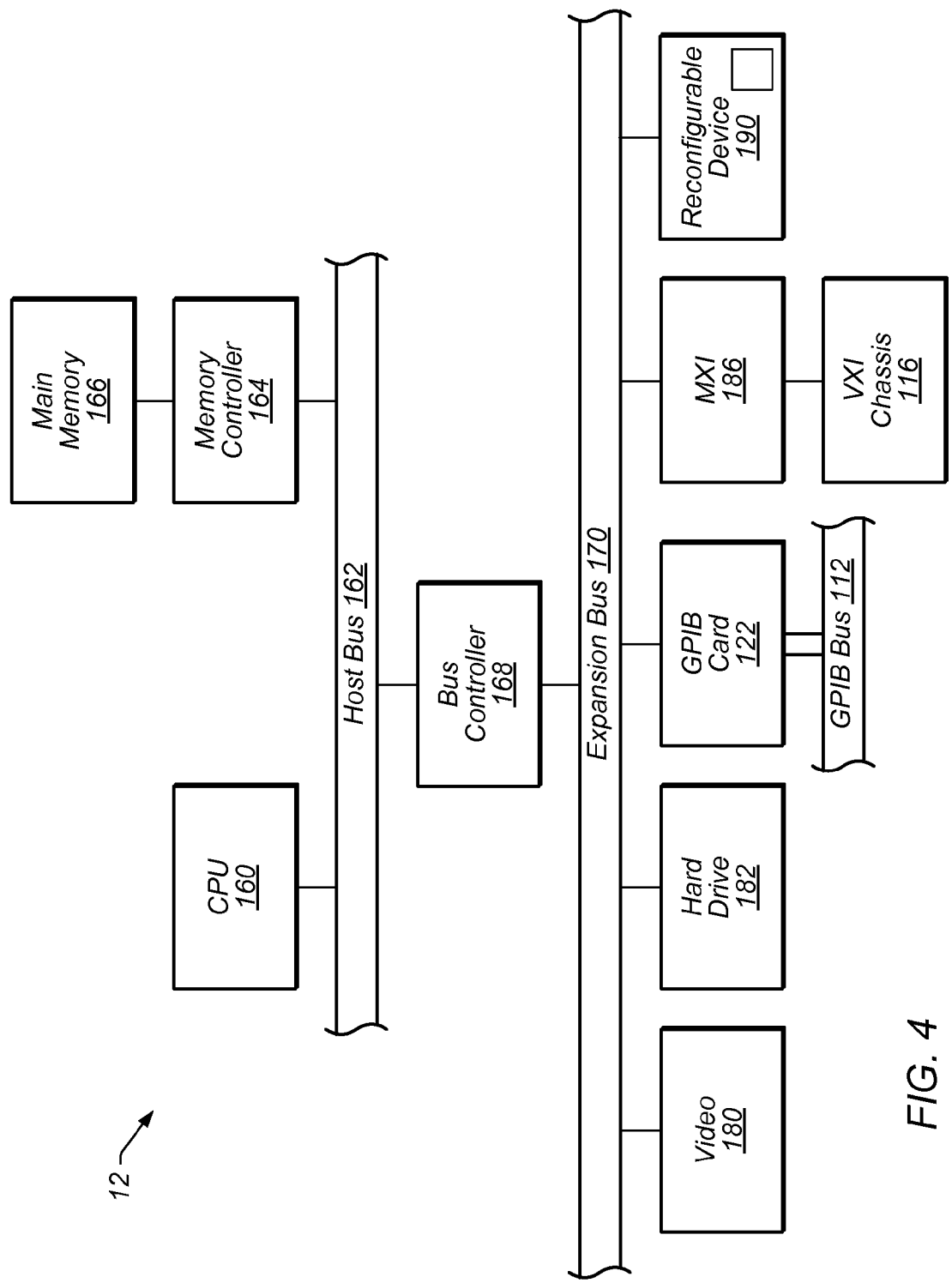
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program instructions executable to convert an object oriented data flow program (or diagram) to a structure oriented program (or diagram). The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a program, such as the converted data flow program, to the device 190 for execution on the device 190.

In embodiments where the data flow program is a graphical program, the deployed program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIG. 5—Flowchart of a Method for Converting a Class Oriented Data Flow Program to a Structure Oriented Data Flow Program FIG. 5 illustrates a method for converting a class oriented data flow program to a structure oriented data flow program, according to one embodiment. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a first data flow program may be received (and stored) on the computer system 82 (or on a different computer system). The first data flow program may be executable to perform a first function. The first data flow program may be received from an external device, e.g., over a network, or may be created on the computer system 82. Descriptions of exemplary approaches to creation of the first data flow program, including embodiments where the first data flow program is a graphical data flow program, are provided below. However, it should be noted that in various embodiments, the first data flow program may be graphical or text-based, as desired. The data flow program may be an object oriented program that includes instances, i.e., objects, of one or more classes. Thus, the data flow program may be referred to as a class oriented data flow program. In various embodiments, the first data flow program may be configured to perform one or more of: an industrial automation function, a process control function, or a test and measurement function, among others.

In 504, the first data flow program may be automatically converted to a second data flow program, where the second data flow program does not include the instances of the one or more classes, and where the second data flow program is executable to perform the first function. For example, automatically converting the first data flow program to a second data flow program may include converting the instances of the one or more classes to a corresponding one or more structures. Thus, the class oriented data flow program may be converted to a corresponding structure oriented data flow program. Note that the second data flow program may be configured to be compiled by a compiler which does not support classes.

Each structure may include data elements corresponding to data elements of the corresponding class. Note that as used herein, the term "structure" refers to a data structure that includes one or more data fields or substructures, where the data fields or substructures may be of different types, i.e., the data structure may be heterogeneous. Moreover, in various embodiments, the data structure may include nested structures, or may be "flat", i.e., may contain all data members in one level. Note further that the structure(s) may be referred to in any of a variety of ways, so long as the term is used to denote a data structure as defined above. For example, in some embodiments, such structures may be referred to as "clusters", emphasizing the fact that each structure may include heterogeneous data fields. Thus the term "structure" refers to an aggregate data type. Examples of "structures" includes "structs" in the C programming language, "clusters" in the LabVIEW programming environment, etc.

The term "structure oriented" program (e.g., structure oriented data flow program) refers to a program that uses structures in place of or instead of object oriented constructs as described herein. In other words, a structure oriented program is one in which data are organized and managed in non-class-based data structures, as opposed to a class or object oriented program, in which the organization and management of data (and often, functions) are defined and implemented in accordance with class definitions per object-oriented techniques. Thus, a structure oriented program may be executed under or on an execution system or platform that does not support class or object based operations.

In 506, the second data flow program may be stored on a computer memory. The second data flow program may be configured to be deployed to a device, where the second data flow program is executable on the device to perform the first function. More specifically, the second (e.g., structure oriented) data flow program may be configured to be deployed to a device that does not support operations necessary for support of classes. For example, the second data flow program may be deployable to a device that does not support pointers, memory addressing, or dynamic dispatch. An example of such a device is a programmable hardware element, e.g., a field programmable gate array (FPGA), or other device with static resources. Thus, the first data flow program may not be deployable onto a programmable hardware element, whereas the second data flow program may be configured to be deployed onto a programmable hardware element.

In some embodiments, the second data flow program may be deployed to a first device, where the second data flow program is executable on the first device to perform the first function. For example, the second data flow program may be deployed to a programmable hardware element (PHE), e.g., an FPGA, where the second data flow program may first be used to generate a corresponding hardware configuration program (HPC), which may then be compiled to a netlist and deployed to the PHE.

Embodiments

The following describes various exemplary embodiments of the method of FIG. 5, although it should be noted that the descriptions presented are not intended to limit the invention to any particular form, function, or appearance.

In some embodiments, there may be constraints on the classes allowed in the data flow program, e.g., depending on the complexity of the conversion process implemented. Thus, the data flow program may be automatically analyzed to ensure that the constraints are met, e.g., that only classes of one or more specified categories are used in the program, and appropriate error messages generated, e.g., where the error messages describe the violations detected. The analysis may be directed to syntax and/or the manner in which data or structures are used in the program, as will be discussed below in more detail. Thus, the method may include performing syntax checking to insure that the one or more classes only include classes of one or more specified categories, and generating a compiler error if the syntax checking determines that at least one of the one or more classes is not of the one or more specified categories.

For example, in one embodiment, a constraint may be that the one or more classes may derive only from a (single) root ancestor class, have no descendent classes, and require no dynamic dispatching. Such classes may be referred to as "flat classes". Note that in these embodiments, inheritance is not an issue, and so converting instances or objects of classes may simply be a matter of replacing class objects, e.g., class-based graphical user interface (GUI) elements, e.g., controls/indicators in the program, with structure controls/indicators of the appropriate type.

Following the above example, in one embodiment, the method may perform type checking to insure that the one or more classes only include classes that derive only from a root ancestor class, have no descendent classes, and require no dynamic dispatching, and may generate a compiler error if the type checking determines that at least one of the one or more classes derives from a non-root ancestor class, has one or more descendent classes, or requires dynamic dispatching. In some embodiments, the type checking and generating a compiler error may be performed by a compiler, although in other embodiments, a tool at least partially independent from the compiler may be used, e.g., invoked during, by, or as part of, and the compilation process.

Thus, in one embodiment, the method may include analyzing each class utilized in the data flow program, and checking that it has no ancestors (e.g., other than a single root ancestor class) and no descendents. If any class does not meet this constraint, an error message may be generated that describes the constraint violation, e.g., providing the name of the class, and possibly where in the program the violation occurred. The developer may then modify the data flow program accordingly, e.g., removing or replacing the offending objects/classes.

As another example of constraints, in some embodiments, the syntax checking of the compiler may allow all classes, but the compiler may impose constraints on the use of the classes. For example, the compiler may require that a class not use data elements of data types that are not supported on the target machine.

Again, once the data flow program is confirmed as not violating the constraints, e.g., following the above example, only using flat classes, the instances of the classes in the program may each be converted to a corresponding structure, i.e., a structure of a corresponding type. Note that in some embodiments, for each class, there is a corresponding structure type. For example, an instance of a class with three integers and a double may be converted to an instance of a structure with three integers and a double, and so forth. Further embodiments are described below with alternative approaches to the structures.

In one embodiment, the standard compilation process may be "intercepted" or interrupted and the conversions or replacements of the class objects performed, after which the compilation process may be resumed. For example, in an embodiment where the data flow program is being compiled for a programmable hardware element such as an FPGA, the compile process may be intercepted at the point where the data flow program's calling hierarchy is transformed into another calling hierarchy appropriate for the FPGA, and all instances of a LabVIEW class searched for and replaced with a corresponding structure. In embodiments with the constraint that all classes must be flat classes, this simple class instance replacement may be all that is required for the conversion to the structure oriented data flow program, and the compilation process may be continued per normal fashion. However, in other embodiments, the conversion process may be significantly more complex and involved, as will be described in detail below.

Note that in some embodiments, the data flow program may utilize classes with zero (no) elements, which may be referred to as "empty classes". These classes are generally ancestor classes that other classes inherit from, and as such would be rare in embodiments directed to programs with only flat classes; however, in some embodiments empty classes with no descendants may be used. For example, in embodiments where the data flow program is a graphical data flow program, i.e., where the program includes graphical program nodes connected via "wires" that carry data between the nodes, empty classes have no value on the wire and their only purpose is to provide the dataflow sequence for operations. In one embodiment, such empty classes may be replaced with a Boolean type, or other minimal-size data type, when performing the conversion. In another embodiment, such empty classes may be replaced with a type that truly allocates no memory.

When the search/replace process is finished, the data flow program, including its calling hierarchy, subprograms, etc., is structure-based, and after compilation can be deployed and used on a device that does not support operations necessary for support of classes, e.g., pointers, memory addressing, or dynamic dispatch, such as a programmable hardware element, e.g., an FPGA. Thus, in these "flat class" embodiments, the compiler may reject non-flat classes, and simply replace all others (e.g., instances of flat classes) with corresponding structures.

It should be noted that any of the embodiments disclosed herein may be directed to a programmable hardware element. For example, any of the conversion processes disclosed herein may include compiling the second data flow program into a hardware configuration program, where the hardware configuration program is configured to be deployed onto a programmable hardware element, and may further include deploying the hardware configuration program to the programmable hardware element.

FIG. 6—Flowchart of a Method for Converting a Class Oriented Data Flow Program to a Structure Oriented Data Flow Program for Deployment to a Programmable Hardware Element FIG. 6 illustrates a method for converting a class oriented data flow program to a structure oriented data flow program for deployment to a programmable hardware element, e.g., an FPGA, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a first data flow program may be received on the computer system 82 (or on a different computer system), where the first data flow program is an object oriented program that includes instances, i.e., objects, of one or more classes, and is executable to perform a first function. Further details regarding this method element are described above with respect to FIG. 5.

In 504, the first data flow program may be automatically converted to a second data flow program, where the second data flow program does not include the instances of the one or more classes, and where the second data flow program is executable to perform the first function, as described in detail above with reference to FIG. 5.

In 606, the second data flow program may be compiled into a hardware configuration program, where the hardware configuration program (HCP) is configured to be deployed onto a programmable hardware element (PHE), e.g., an FPGA. In one embodiment, the HCP may be deployed to the PHE, wherein the HCP is executable on the PHE to perform the first function. For example, the HCP may be compiled to a netlist and deployed to the PHE.

Note that the programmable hardware element may not support dynamic memory operations, and that the first data flow program may not be deployable onto the programmable hardware element. In some embodiments, type checking may be performed to insure that all operations specified in the program can be converted to operations supported by the programmable hardware element, and an error may be generated if the type checking determines that any operations specified by the program cannot be converted to operations supported by the programmable hardware element.

Further Embodiments

Below are presented various other embodiments of the methods of FIG. 5 and FIG. 6, although it should be noted that the embodiments described are meant to be exemplary, and are not intended to limit the invention to any particular form, function, or appearance. Moreover, any features of any of the disclosed embodiments may be used with any other embodiments as desired.

Graphical Data Flow Programs

In some embodiments, the first data flow program may be a class oriented graphical data flow program, as mentioned above. The class oriented graphical data flow program may be created or assembled by the user arranging on a display a plurality of nodes or icons and then interconnecting the nodes to create the class oriented graphical data flow program. In response to the user assembling the class oriented graphical data flow program, data structures may be created and stored which represent the class oriented graphical data flow program. In various other embodiments, the nodes may be interconnected in one or more of a data flow, control flow, or execution flow format. Thus, in some embodiments, the first data flow program may be or include a (class oriented) graphical data flow program, including a plurality of interconnected nodes that visually indicate functionality of the program.

As noted above, the class oriented graphical data flow program may comprise a block diagram and may also include a user interface portion or front panel portion. Where the class oriented graphical data flow program includes a user interface portion, the user may optionally assemble the user interface on the display. As one example, the user may use the LabVIEW class oriented graphical data flow programming development environment to create the class oriented graphical data flow program.

In an alternate embodiment, the class oriented graphical data flow program may be created by the user creating or specifying a prototype, followed by automatic or programmatic creation of the class oriented graphical data flow program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The class oriented graphical data flow program may be created in other manners, either by the user or programmatically, as desired. The class oriented graphical data flow program may implement a measurement (or other type of) function that is desired to be performed by the instrument.

Similar to the above, in some embodiments where the class oriented data flow program is a class oriented graphical data flow program, the structure oriented data flow program may be a structure oriented graphical data flow program. In other words, the result of the above conversion may be a graphical data flow diagram that has no classes or class mechanisms.

Inheritance

Note that target platforms that have fixed resources, and thus cannot support dynamic memory or resource operations such as dynamic dispatch, memory addressing, dynamic allocation, and so forth, may still be desirable for many applications, including class based applications. Thus, in some embodiments, rather than disallowing class mechanisms such as inheritance (with its requirement for dynamic dispatch), additional structure and/or method elements may be provided to support such features.

Figure 7:
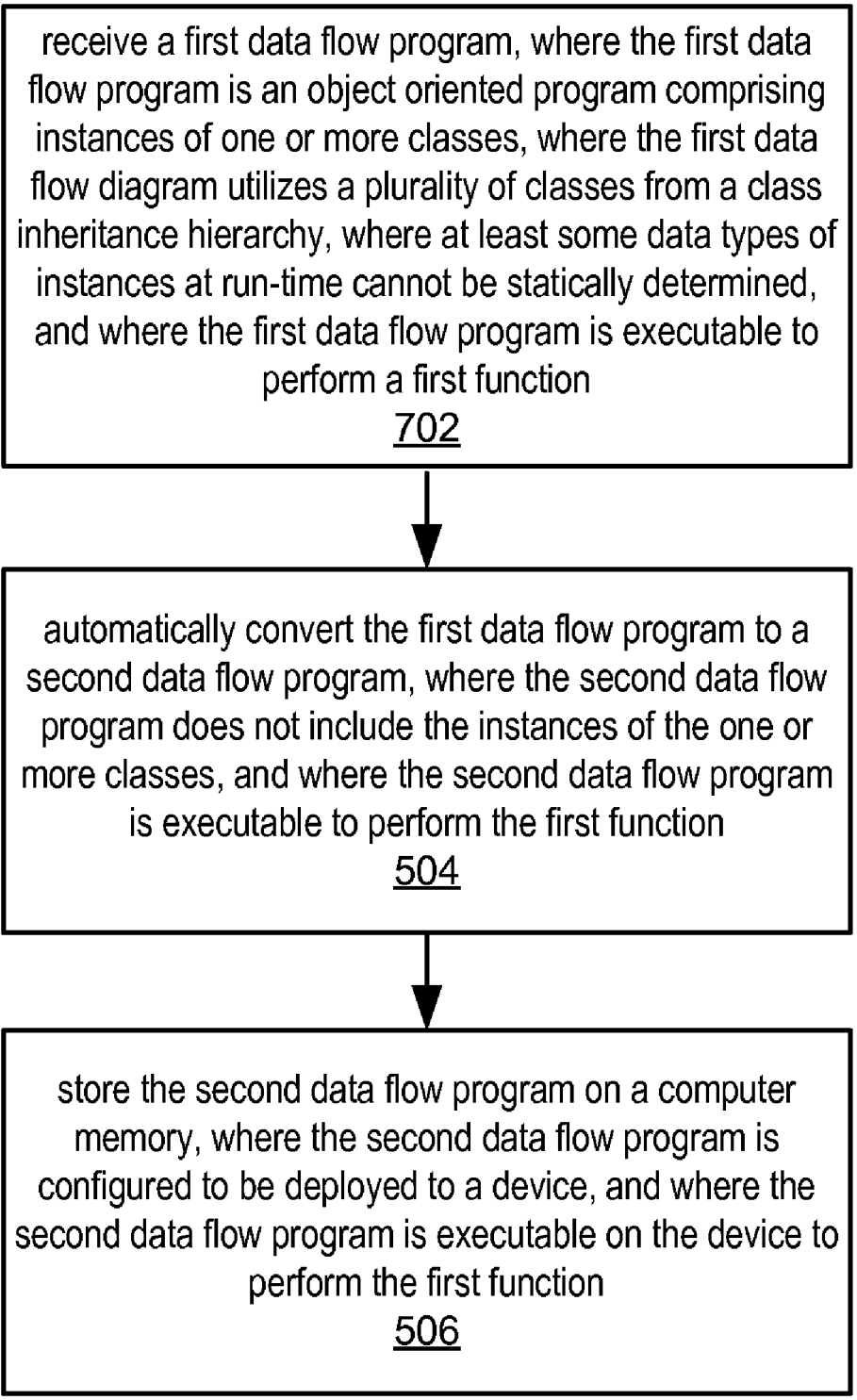
FIG. 7 is a flowchart diagram illustrating one embodiment of a method for converting a class oriented data flow program with inheritance to a structure oriented data flow program.

FIG. 7—Flowchart of a Method for Converting a Class Oriented Data Flow Program With Inheritance to a Structure Oriented Data Flow Program FIG. 7 illustrates a method for converting a class oriented data flow program with inheritance to a structure oriented data flow program, according to one embodiment. The method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 702 a first data flow program may be received on the computer system 82 (or on a different computer system), where the first data flow program is an object oriented program that includes instances, i.e., objects, of one or more classes, where the first data flow diagram utilizes a plurality of classes from a class inheritance hierarchy, and where the first data flow program is executable to perform a first function. In other words, at least one class has at least one ancestor class or at least one descendent class.

In 504, the first data flow program may be automatically converted to a second data flow program, where the second data flow program does not include the instances of the one or more classes, and where the second data flow program is executable to perform the first function, as described in detail above with reference to FIG. 5.

In 506, the second data flow program may be stored on a computer memory. The second data flow program may be configured to be deployed to a device, where the second data flow program is executable on the device to perform the first function. Further details of 506 are provided above with reference to FIG. 5.

As described above, automatically converting the first data flow program to a second data flow program may include converting the instances of the one or more classes to a corresponding one or more structures. Thus, the class oriented data flow program may be converted to a corresponding structure oriented data flow program. Note that because the first data flow diagram utilizes a plurality of classes from a class inheritance hierarchy, each of the one or more structures may include data elements corresponding to data elements of the corresponding class and any ancestor classes. The class-specific structure may be implemented in any of a variety of ways. For example, in one embodiment, the structure may be a structure of structures, with internal structures corresponding to respective levels in the class's inheritance chain. The internal structures may be nested, or may be contained at the same level. Alternatively, the class-specific structure may simply contain all data elements in the chain at one level, i.e., with no internal structures.

Moreover, such class inheritance hierarchies may introduce additional complexities regarding runtime behavior, where, for example, the class type of an instance used in the program, a subprogram, or subprogram invocation may or may not be known before runtime. Such dynamic determination of function invocations is referred to as dynamic dispatch. Note that as used herein the terms "subprogram" and "function" are used interchangeably.

In some embodiments, automatically converting the first data flow program may include converting any instance of a parent class constant with a value of a child class to a constant of the child class, and convert the constant of the child class to a constant of a corresponding data type. In other words, any constants of a class that have been up-cast to an ancestor class may be converted back to the appropriate child class, then that child class converted to the corresponding data type.

In one embodiment, a determination may be made (automatically by software) as to whether every dynamic dispatch subprogram invocation in the first data flow program is resolvable to a static invocation of a class-specific subprogram at compile time, and an error may be generated if any dynamic dispatch subprogram invocation in the first data flow program is not resolvable to a static invocation of a class-specific subprogram at compile time. Thus, in this embodiment, dynamic dispatch may not be supported or allowed, although, in other embodiments, such dynamic determination of data types may be supported, as will be described further below.

As noted above, the compiler (or an associated process) may impose constraints on the types of classes allowed in the conversion process. For example, the compiler may constrain the first data flow program to only include leaf level classes, and generate a compiler error if a non-leaf level class is detected. However, in other embodiments, when an instance of a non-leaf level class is encountered, a process referred to as "type propagation" may be performed, where the use of the instance is tracked through a traversal of the calling hierarchy of the program. Said another way, the non-leaf level class, which by definition is a parent class of at least one child class, may be propagated through the program, and data types and/or program code modified as needed to ensure type consistency in the program. After all the classes haven propagated, any resulting data type errors, e.g., in the case of graphical data flow programs, "broken wires", may be detected. Similarly, checks may be made for errors regarding array builds or merging of or inappropriate interactions between two different classes.

In some embodiments, the conversion or replacement process may include generating one or more copies of a subprogram corresponding to one or more different child classes of an ancestor class for which the subprogram was written. Said another way, some subprograms may be written in terms of (instances of) ancestor classes. Prior to conversion, such a subprogram may be called by an instance of a child class or passed an instance of a child class as input, and so during execution would normally require dynamic dispatch to resolve the function call for the child class, which may not be permissible or supported. Thus, for each call or invocation of the subprogram (written in terms of the ancestor class), the subprogram may be cloned, i.e., duplicated or copied, and instances of ancestor classes in the subprogram replaced with instances of the appropriate child class, after which the class/structure replacement process may be performed on the (copy or clone of the) subprogram. Note that a subprogram written for an ancestor class may be duplicated multiple times, e.g., once for each of the child classes that actually calls it. A detailed description of such type propagation and function cloning according to one embodiment is now presented.

Type Propagation

In embodiments where the first data flow program includes one or more data flow subprograms, automatically converting the first data flow program may include:

a) for each subprogram invocation in the data flow program:
  i) if the subprogram invocation is a dynamic dispatch invocation, replace the subprogram invocation with a static invocation of a class-specific implementation of the subprogram;
  ii) if an input class specified for the subprogram is an ancestor class of a corresponding child class specified as input in the invocation, clone the subprogram, thereby generating a clone subprogram, replace any reference to the ancestor class in inputs of the clone subprogram with a reference to the child class, and replace the subprogram invocation with an invocation of the clone subprogram;
  iii) perform a) with respect to the subprogram;
  iv) if an output class returned by the subprogram invocation is returned as an output of the data flow program and the output class returned by the subprogram invocation is a descendant class of the class specified as output of the data flow program, replace any reference to the ancestor class in the output of the data flow program with a reference to the child class returned by the subprogram invocation; and b) for the first data flow program and each subprogram invoked directly or indirectly by the first data flow program, replace each instance of each class with the corresponding structure for that class.

Thus, dynamic dispatch invocations may be replaced with respective static invocations when inputs of the invocations differ from those of the invoked subprograms, and the subprograms cloned accordingly. In this manner, the branching of instances and subprograms that normally occurs dynamically via dynamic dispatch mechanisms may be performed at compile time (or at least prior to runtime) by proliferating or generating static versions of the instances and subprograms.

As may be seen, the above method elements may naturally lend themselves to recursive implementation, although it should be noted that iterative implementations are also possible, as is well known to those of skill in the programming arts.

As indicated above, in some embodiments, various forms of error checking may be performed. For example, the one or more classes may be constrained to one or more specified categories, and so the method may perform type checking to insure that the one or more classes only include classes of the one or more specified categories, and may generate an error if the type checking determines that at least one of the one or more classes is not of the one or more specified categories.

As another example, in one embodiment, the first data flow program may be analyzed (automatically, i.e, by software), and at least one violation of static program runtime behavior determined based on the analysis of the first data flow program. At least one error message corresponding to the at least one violation may be generated, where the at least one error message includes a description of the at least one violation.

Following such type propagation through the program calling hierarchy, data access for some instances may require modification. For example, note that when an instance of a flat class is converted to a corresponding structure, access to the data elements is direct, but when an instance of a leaf level class (with ancestors) is converted to a structure of structures, data access may be complicated by the nested structure, specifically, due to intervening structures that must be addressed or navigated to access data elements in the internal structures.

Figure 8A:
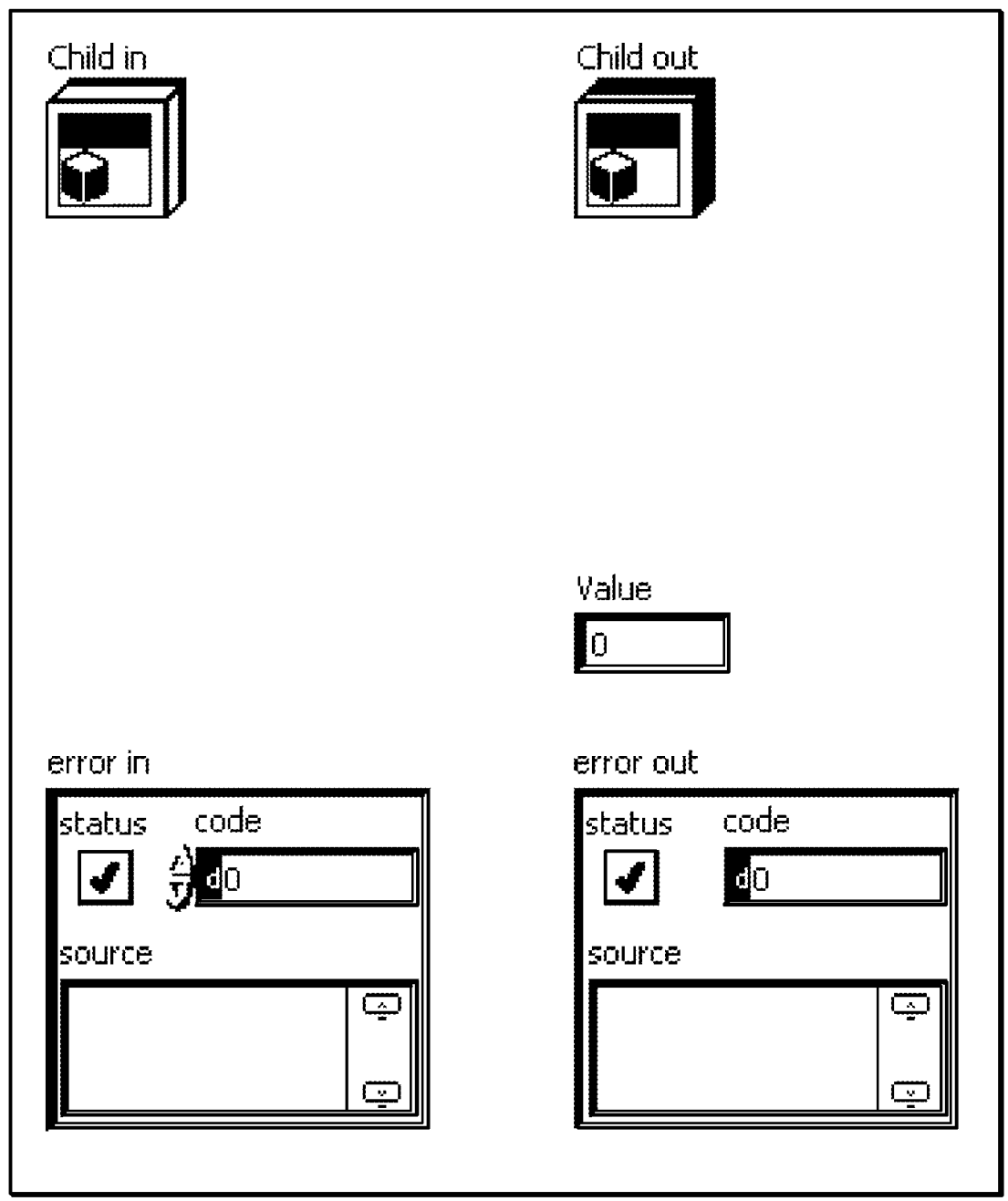
FIGS. 8A and 8B illustrate an original graphical data flow subprogram prior to conversion, where the subprogram takes an instance of a child class as input, directly accesses a data element, and outputs the instance of the child class.
Figure 8B:
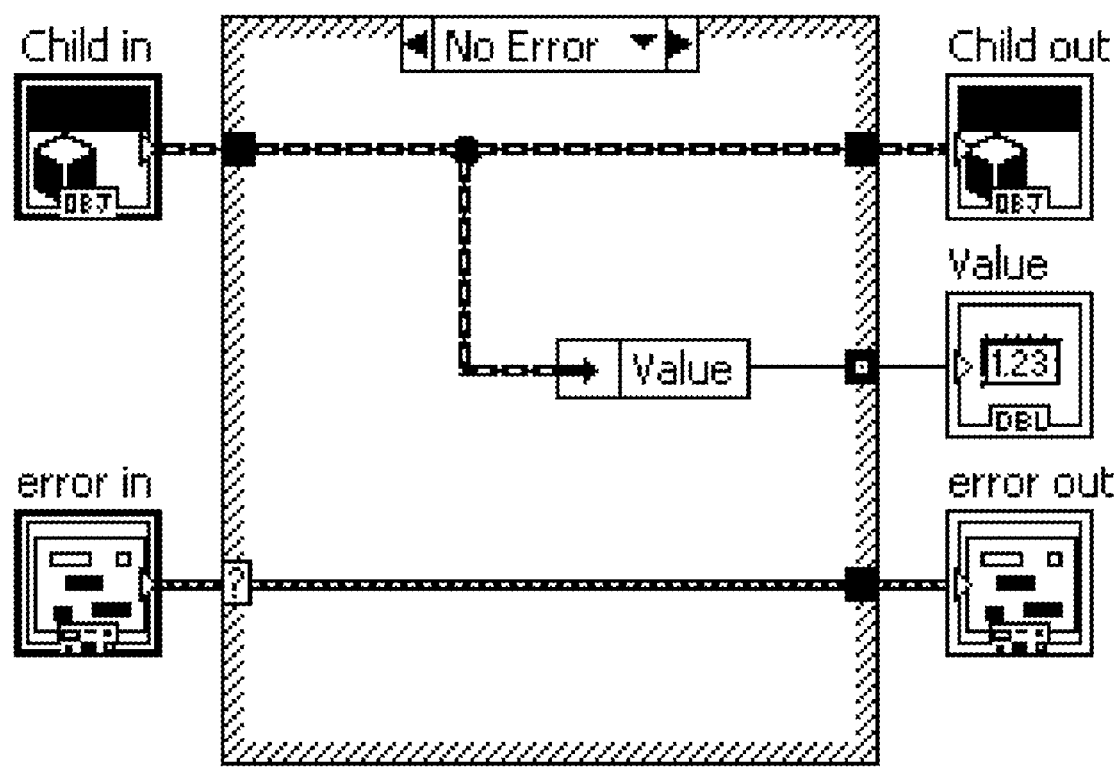
Figure 9A:
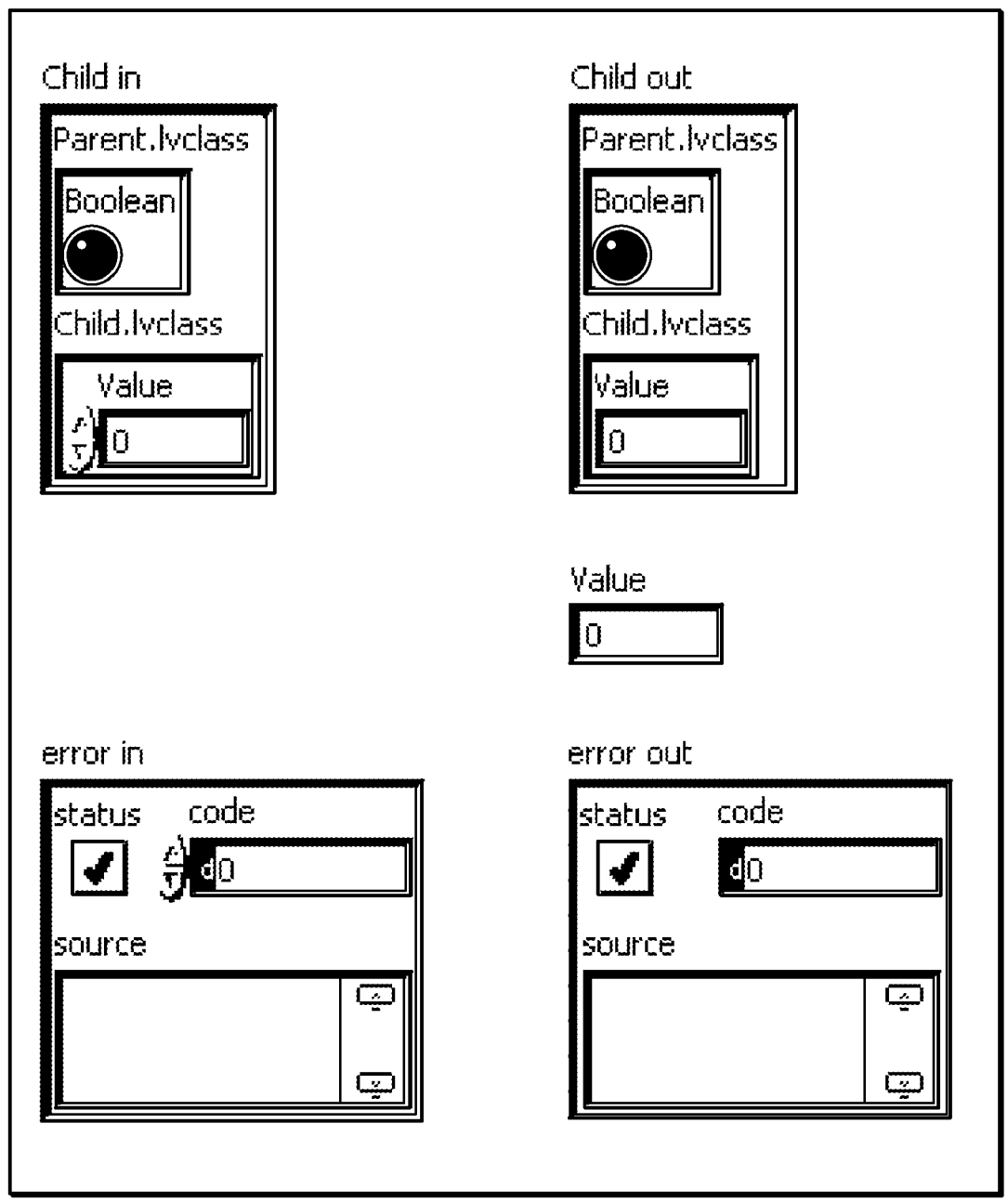
FIGS. 9A and 9B illustrate the subprogram of FIGS. 8A and 8B after conversion, where access to the child data requires additional explicit scope resolution.
Figure 9B:
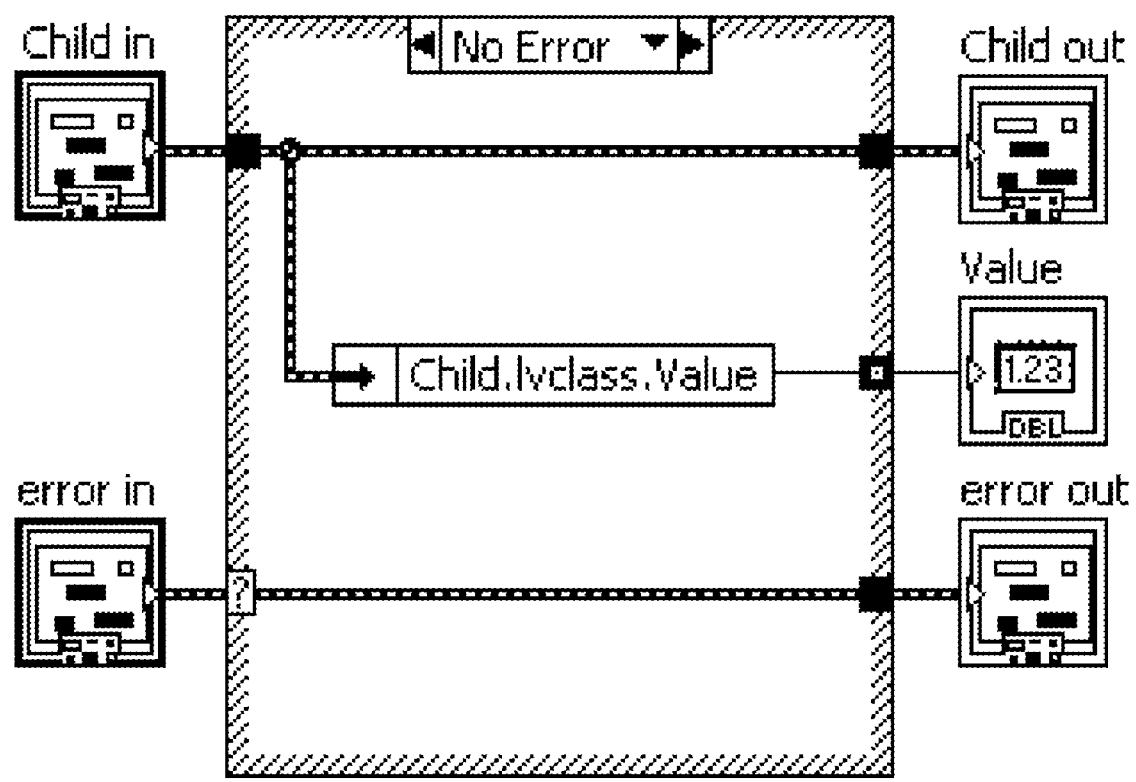

FIGS. 8A/8B and 9A/9B illustrate this issue with respect to a graphical data flow subprogram written for an ancestor class, but called with respect to a child class, where FIGS. 8A and 9A show front panels (GUIs) for graphical program block diagrams of FIGS. 8B and 9B, respectively. More specifically, FIGS. 8A/8B illustrate an original graphical data flow subprogram prior to conversion, where, as may be seen, the subprogram takes an instance of a child class as input, directly accesses data element "value", which is output to the front panel for display, and outputs the instance of the child class. Note that dynamic dispatch automatically handles the resolution of the child data access. In contrast, FIGS. 9A and 9B represent the subprogram after conversion, where, as shown, access to the child data requires additional explicit scope resolution (Child.lvclass). Thus, conversion of the first data flow program may include generating additional program code that explicitly implements access to child data.

Note that if a parent instance contains child data, the parent instance may be converted to a structure of the child type, not the parent type. Note further that in some embodiments, in the above-described type propagation/subprogram-cloning/structure replacement process, if an error condition is detected, rather than simply reporting that a subprogram has an error, an evaluation may be made regarding the circumstances of the error condition, and a more useful description of the error provided.

Figure 10A:
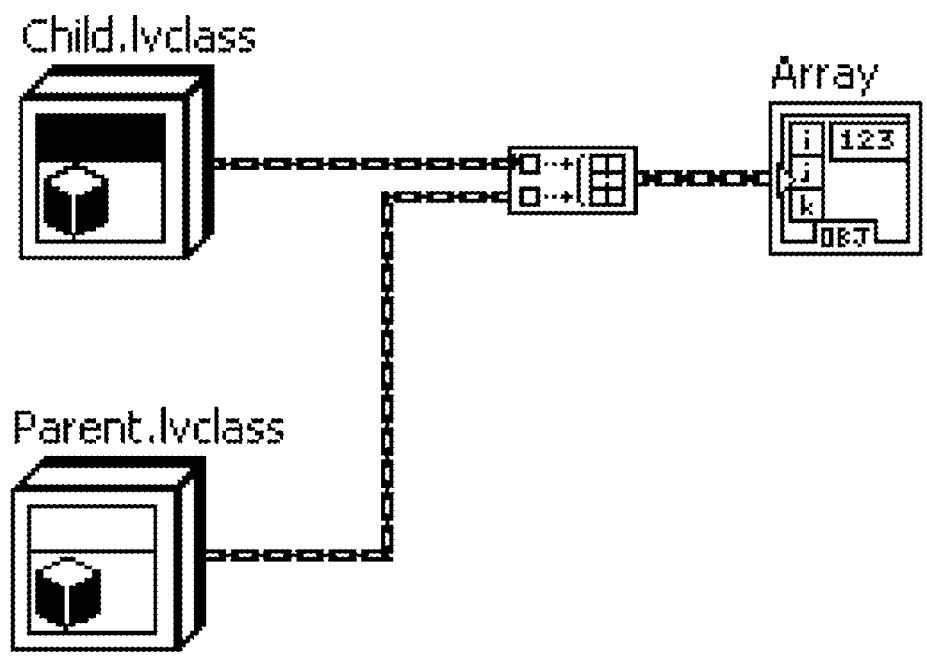
FIGS. 10A and 10B illustrate type ambiguities in graphical data flow programs that would result in errors, according to one embodiment.
Figure 10B:
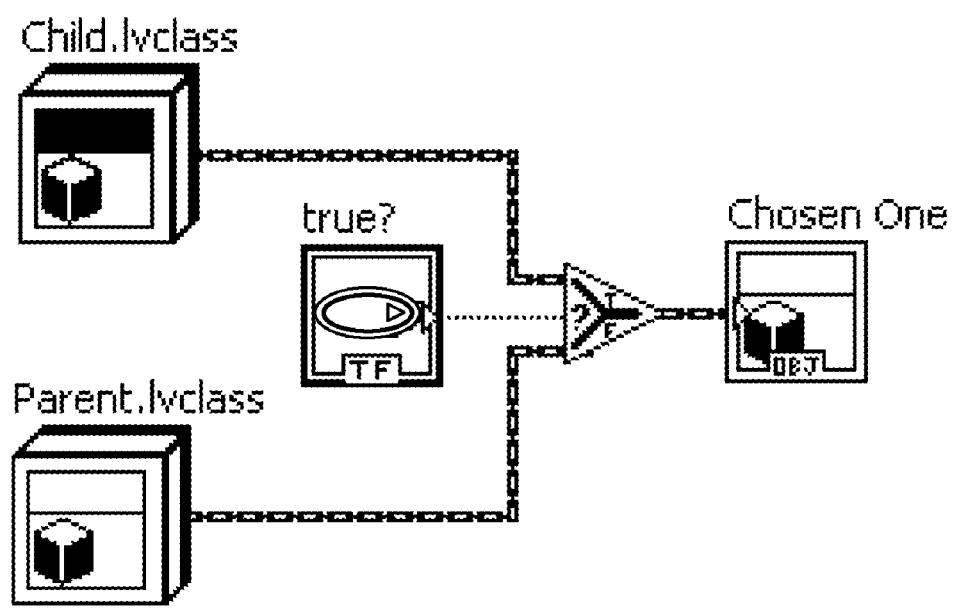

For example, FIGS. 10A and 10B illustrate such type ambiguities in graphical data flow programs (VIs) that would result in errors. In FIG. 10A, instances of a child class and a parent class are merged into the same array, which is acceptable in a class oriented program, but which causes a type conflict when the instances are converted to structures, since an array cannot store heterogeneous data types. Similarly, in FIG. 10B, which illustrates an object selection process, the wire between the selector (triangle icon) and the "chosen one" object is capable of carrying data for instances of either class, which works in class oriented programs, but not when the instances are converted to structures.

Now, rather than simply determining a "broken wire" condition, and reporting "This VI results in a broken VI when trying to compile for FPGA", the program may be evaluated at various points, and a better, more descriptive, error message may be provided, such as, for example, "This node (or tunnel) is building an array of different classes. Inheritance is not supported under FPGA", or "This terminal's value may be either of several classes depending upon conditions at runtime. FPGA requires all types be determinable at compile time."

Dynamic Interpretation of Inherited Data Types

As noted above, when target platforms or compilers do not support certain types of operations, e.g., operations supporting classes, dynamic memory operations, and so forth, one may restrict the program to static operations, e.g., replacing all dynamic dispatch function or subprogram invocations with static invocations of cloned versions of the subprograms (functions) (see, e.g., the description in 506 of FIG. 5), disallowing dynamic type determination, and so forth. However, in some embodiments, additional structure and processing may be employed to facilitate dynamic operations regarding inherited data types.

Figure 11:
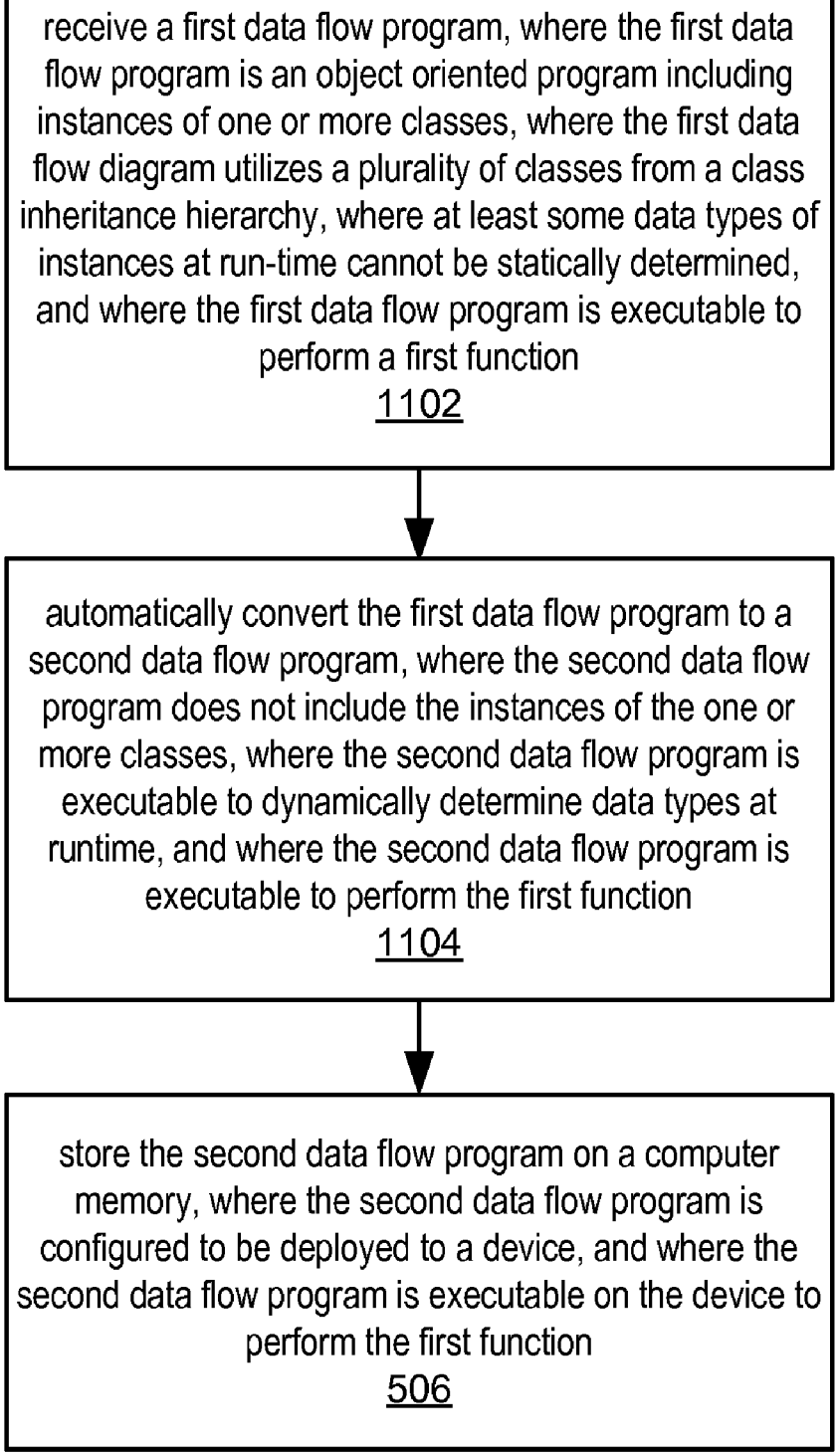
FIG. 11 is a flowchart diagram illustrating one embodiment of a method for converting a class oriented data flow program to a structure oriented data flow program with dynamic interpretation of data types.

FIG. 11—Flowchart of a Method for Converting a Class Oriented Data Flow Program with Inheritance to a Structure Oriented Data Flow Program with Dynamic Interpretation of Data Types FIG. 11 illustrates a method for converting a class oriented data flow program to a structure oriented data flow program with dynamic interpretation of data types, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 1102 a first data flow program may be received on the computer system 82 (or on a different computer system), where the first data flow program is an object oriented program that includes instances, i.e., objects, of one or more classes, where the first data flow diagram utilizes a plurality of classes from a class inheritance hierarchy, where at least some data types of instances at run-time cannot be statically determined, and where the first data flow program is executable to perform a first function. In other words, in contrast with the embodiment described with respect to 702, in these embodiments, static determination of data types is not always possible.

As noted above, in various embodiments, the first data flow program may be textual or graphical in nature. For example, in one embodiment, the first data flow program may be or include a graphical data flow program, including a plurality of interconnected nodes that visually indicate functionality of the program. Moreover, the first data flow program may be configured to perform any of a wide variety of functions, e.g., an industrial automation function, a process control function, or a test and measurement function, among others.

In 1104, the first data flow program may be automatically converted to a second data flow program, where the second data flow program does not include the instances of the one or more classes, where the second data flow program is executable to dynamically determine or interpret data types at runtime, and where the second data flow program is executable to perform the first function.

Similar to the embodiments described above with respect to FIG. 7, automatically converting the first data flow program to a second data flow program may include converting the instances of the one or more classes to a corresponding one or more structures, where each of the one or more structures comprises data elements corresponding to data elements of the corresponding class and any ancestor classes. However, note that since the first data flow program includes instances of classes in a class hierarchy, and the data type of at least some of the instances cannot be statically determined, the functionality normally provided by dynamic dispatch operations of the programming language may be implemented via additional structure and processing in the program itself.

For example, in some embodiments, the one or more classes include at least one descendant class that has ancestor classes. For at least one instance of a class that can be statically determined to be of a particular class, the converting may include converting the at least one instance to a corresponding structure that includes data elements corresponding to data elements of the particular class and any ancestor classes, similar to the conversion described above with respect to 704 of FIG. 7. However, for at least one instance of a class that requires dynamic determination of class type, the converting may include converting the at least one instance to a generic structure for containing, i.e., configured to contain, all data members of any class and its ancestor classes. This generic structure is a key element that facilitates dynamic determination or interpretation of data types at runtime.

In one embodiment, the method may include analyzing (e.g., automatically, i.e., via software) a class hierarchy of the first data flow program to determine a union of data members of the classes in the class hierarchy, and determining the generic structure based on the determined union, where the generic structure is for storing, i.e., is configured to store, all data members of any class in the class hierarchy of the first data flow program and its ancestor classes. In other words, the generic structure, which may also be referred to as a union structure, may be large enough to represent any class in the class hierarchy. The generic structure may include an enum for denoting a runtime data type of the generic structure, as well as a set of elements sufficient for representing data for any class in the class hierarchy and its ancestor classes. The enum may be set at runtime to denote the data type of the structure as dynamically determined at runtime.

Said another way, since programmable hardware elements (or other fixed resource platforms) require fixed size allocations, the hierarchy of classes for the data flow program (e.g., application) may be analyzed, and the smallest structure needed to contain all the elements of any class in the hierarchy determined, i.e., a structure large enough for any single class used anywhere in the program. Thus, for example, instead of replacing each leaf level class instance with a respective and corresponding class-specific structure, e.g., a structure of structures, the class instances may be replaced with a generic structure containing a set of elements sufficient to represent data for any class in the inheritance tree, and an enum (or functional equivalent) that may be used to denote or specify the structure type. Thus, once these class instances are each replaced with the generic structure, and the enum set to the correct type, during execution, program logic may dynamically determine how to interpret the generic structure based on the enum value. Dynamic dispatch subprogram calls (e.g., in graphical program embodiments, subVI calls), instead of being converted or cloned into static subprogram calls as described above, may become case structures that use the enum value to select which of several subprograms to execute.

There is more than one way to implement the generic or union structure described above. Suppose, for example, that a Parent class has no fields, but has two children: Child A, which has three int16s, and Child B, which has one uInt32 and one int16. In one approach, the three int16s use the same amount of memory as the one uInt32 and single int16. Thus, depending upon the value of the enum, the remaining fields may be handled either as Child A data or as Child B data. In a second approach, the single int16 field is the only item shared between the two, and thus, the generic may need three int16s and one uInt32 to represent the data. Note that the first approach is more efficient for a programmable hardware element, e.g., an FPGA.

However the second approach may be more viable to implement in some cases, e.g., where there is no mechanism to address a block of memory as different types of data. Thus, unless such capabilities are supported by the development environment, the second approach may be the preferred way to implement classes, or, more specifically, to replace class instances with corresponding structures without sacrificing desired functionality. Note that either of the above approach (es) may not be appropriate for all cases or applications. For example, due to the limited resources of a programmable hardware element such as an FPGA, allocating a large amount of space (for many instances of generic structures) that will never be needed on the off chance that a class of a different type is used may be wasteful. Note, however, that as programmable hardware becomes cheaper and larger, i.e., has more resources to allocate, the union/generic structure approach may become more feasible or affordable, and thus may be specified as the default.

There are further ways in which the generic structure may be implemented. For example, in one embodiment, the generic structure may include a fixed portion comprising data elements corresponding to data elements of the class and any ancestor classes, and a generic portion for containing, i.e., configured to contain, all data members of any descendant classes of the class. Note that in this embodiment, there may be multiple generic structures respectively implementing or representing (replacing) a subset of the classes in the hierarchy, where the fixed portion may be dependent upon the corresponding class. Note, however, that in other embodiments, there may be no fixed portion, and so there may be only one type of generic structure used for any and all classes.

In one embodiment, the user may be able to configure the conversion process. For example, the method may include receiving input specifying at least one instance of a class to convert to a class-specific structure, and at least one instance of a class to convert to a generic structure, where at least a subset of the specified instances are converted to class-specific structures or generic structures in accordance with the user input. In other words, instances of a class whose instances are specified for conversion to a class-specific structure may be automatically specified for conversion to class-specific structures, and instances of a class whose instances are specified for conversion to a generic structure are automatically specified for conversion to generic structures.

Alternatively, or in addition to, such user specification of conversion at the instance level, in some embodiments, the user may specify the conversion at the class level. In other words, input may be received specifying at least one class for conversion of instances to class-specific structures, or at least one class for conversion of instances to generic structures, and at least a subset of the instances of the specified classes may be converted to class-specific structures or generic structures in accordance with the user input. For example, for classes specified for conversion to class-specific structures, the method may automatically convert all instances of the classes whose data types can be statically determined to corresponding class-specific structures, and may generate an alert or error informing the user of any instances where such static determination is not possible, and/or automatically convert such instances to generic structures.

Thus, users may be offered the opportunity to select which classes should be deployed using a specific structure for each caller, and which should be deployed using generic structures for all callers, and the instance replacements made accordingly. Those class instances specified for specific structures may be handled and may operate as described above. In other words, when class instances specified for specific structures are encountered, their types may be propagated, substituting the specified structure type for each instance, and, whenever a subprogram (e.g., a subVI) call written or specified for a parent type of the specified class receives or uses the class (child), the subprogram may be cloned and its inputs (and internal instances) replaced with the specific structure corresponding to the (child) class.

For classes specified for replacement with generic structures, the generic structure may be propagated through the calling hierarchy, replacing both class instances and instances of child classes of the class with the generic structure, including subprogram calls that take an instance of the class as input. Note that if other calls to the subprogram take a different type (e.g., a child type) as input, the subprogram is not cloned, since any instances of child classes are replace with the same generic structure, although the structure will retain an enum value that indicates the child type, as discussed above. The generic structures may be built into arrays (or other program data structures) and may be handled by cases, e.g., switch/case structures, such as a selection function or node.

Thus, any class (instance) being marked or specified for conversion to a generic structure may mean that all of its descendants will also be converted to generic structures. Thus, there can be as many levels of specific structure types in the inheritance tree as desired, but once generic structure is specified, the members of the inheritance tree may be marked as the union or generic structure type from that point down in the hierarchy. Moreover, at least some instances may be converted without such guidance from the user. For example, in one embodiment, any instances of classes not specified for conversion to generic structures or for which all data types can be statically determined may be converted to class-specific structures by default. For example, the method may include determining that data types of at least one instance of a class that is specified for conversion to a generic structure can be statically determined, converting the at least one instance of the class to a class-specific structure. As detailed description of one embodiment of such a conversion process is now presented. Note that the following embodiment is similar to that described above with respect to type propagation regarding the method of FIG. 7, but has key aspects that facilitate dynamic determination of data types.

As with the previously described type propagation/conversion technique, the first data flow program includes one or more data flow subprograms. Automatic conversion of the first data flow program may be performed as follows:

a) for each subprogram invocation in the data flow program:
  i) if the subprogram invocation is a dynamic dispatch invocation and the type of the dispatch input can be statically determined, replace the subprogram invocation with a static invocation of a class-specific implementation of the subprogram;
  ii) if the subprogram invocation is a dynamic dispatch invocation and the type of the dispatch input cannot be statically determined, replace the subprogram invocation with multiple static subprogram invocations comprising a respective static invocation for each class that implements an override of the dynamic dispatch invocation, and a programming structure configured to evaluate the type of the dispatch input and select which of the static invocations to invoke;
  iii) if an input class specified for the subprogram can be statically determined and is an ancestor class of a corresponding child class specified as input in the invocation, clone the subprogram, thereby generating a clone subprogram, replace any reference to the ancestor class in inputs of the clone subprogram with a reference to the descendent class, and replace the subprogram invocation with an invocation of the clone subprogram;
  iv) if an input class specified for the subprogram cannot be statically determined, clone the subprogram, thereby generating a clone subprogram, mark any reference to the input class in the inputs of the clone subprogram as requiring dynamic determination of class type, and replace the subprogram invocation with an invocation of the clone subprogram;
  v) perform a) with respect to the subprogram;
  vi) if an output class returned by the subprogram invocation is returned as an output of the data flow program and the output class returned by the subprogram invocation is a descendant class of the class specified as output of the data flow program, replace any reference to the ancestor class in the output of the data flow program with a reference to the descendent class returned by the subprogram invocation;
  vii) if an output class returned by the subprogram invocation is returned as an output of the data flow program and the output class returned by the subprogram invocation is marked as dynamic, mark any reference to the marked class in the output of the data flow program as requiring dynamic determination of class type;

b) for the first data flow program and each subprogram invoked directly or indirectly by the first data flow program, replace each instance of each class with the corresponding structure for that class, including: for at least one instance of a class that can be statically determined to be of a particular class, replace the instance with a corresponding class-specific structure comprising data elements corresponding to data elements of the particular class and any ancestor classes; and for at least one instance of a class that requires dynamic determination of class type, replace the instance with a generic structure configured to contain all data members of any class and its ancestor classes.

Thus, dynamic dispatch invocations may be replaced with respective static invocations when inputs of the invocations differ from those of the invoked subprograms, and the input class specified for the subprogram can be statically determined, and the subprograms cloned accordingly, as with the previously described technique, but in the case that the input class cannot be statically determined, the subprogram invocation is replaced with respective static invocations for each class, and a programming structure, such as a case/switch structure for selecting which of the static invocations to invoke based on the enum value at runtime. Moreover, in this embodiment, any instances of classes whose data type cannot be statically determined are replaced with generic structures, with the statically determinable instances being replaced with class-specific structures.

As with the previous conversion technique, the above method may naturally lend itself to recursive implementation, although iterative implementations may be used as desired.

Note that in some embodiments, the above technique may be modified to accommodate user input specifying whether an instance or even all instances of a class should be converted to class-specific or generic structures. In some embodiments, the method may determine that a data type of at least one instance of a class specified for conversion to a class-specific structure must be dynamically determined, and generate an error message indicating that the at least one instance requires dynamic determination of data type. The user may then change the specification for conversion of that instance, confirm automatic change of the specification (by the method or software), or even edit the program to remove the requirement for dynamic determination of the data type, as desired.

In 506, the second data flow program may be stored on a computer memory. The second data flow program may be configured to be deployed to a device, where the second data flow program is executable on the device to perform the first function. Further details of 506 are provided above with reference to FIG. 5.

The second data flow program may then be deployed to a first device, when the second data flow program is executable on the first device to perform the first function, including dynamically determining the data types of generic structures at runtime.

As noted above with respect to FIG. 5, 6, or 7, in some embodiments, the second data flow program may be configured to be compiled by a compiler which does not support classes. Additionally, the second data flow program may be configured to be deployed to a device that does not support operations necessary for support of classes.

For example, in some embodiments, the first data flow program may not be deployable onto a programmable hardware element, but the second data flow program may be configured to be deployed onto a programmable hardware element. Thus, in one embodiment, the second data flow program may be compiled into a hardware configuration program, where the hardware configuration program is configured to be deployed onto a programmable hardware element. The hardware configuration program may then be deployed onto the programmable hardware element.

User Interface

The following presents exemplary embodiments of a user interface related to the above functionality. Note that while the embodiments shown are directed to graphical data flow programs, the techniques illustrated are also applicable to other types of data flow programs, such as textual data flow programs.

Figure 12:
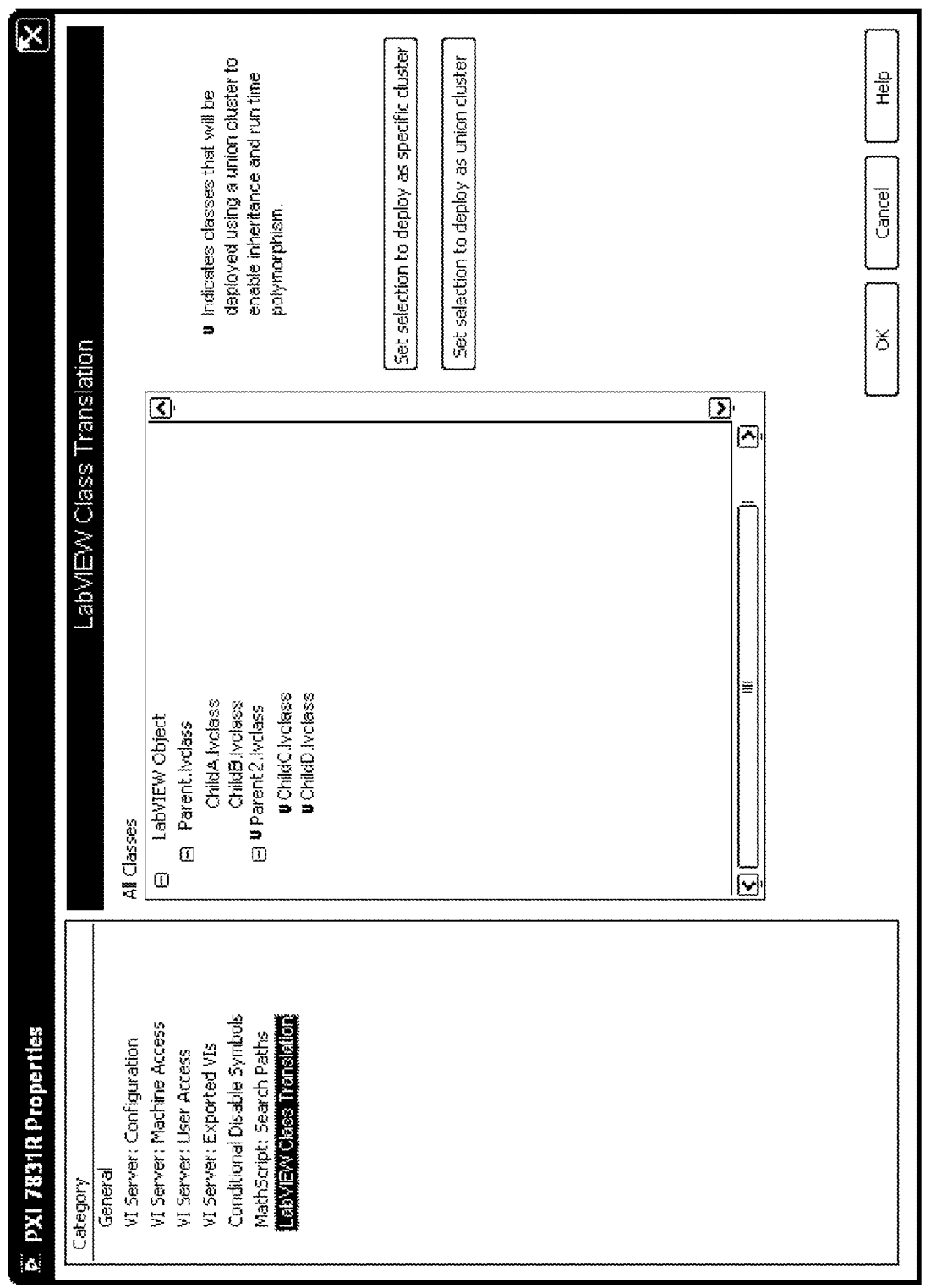
FIG. 12 illustrates one embodiment of a GUI for specifying conversion of a class oriented graphical data flow program to a structure oriented graphical data flow program.

FIG. 12 illustrates one embodiment of a GUI for specifying properties of a computing node, e.g., in a graphical data flow program, specifically, for specifying translation or conversion of a class oriented LabVIEW graphical program to a structure oriented graphical data flow program. It should be noted that the GUI is meant to be exemplary only, and is not intended to limit the GUI to any particular form, function, or appearance. It should be further noted that the graphical nature of the data flow program is also meant to be exemplary, and is not intended to limit the type of data flow programs contemplated to any particular type.

As may be seen, this GUI displays a class hierarchy for a graphical data flow program (middle portion of the window), including a root object class, called LabVIEW Object, and two classes derived from the root class, referred to here as Parent and Parent2. Both Parent and Parent2 classes also have respective descendent classes, specifically, ChildA and ChildB, derived from Parent, and ChildC and ChildD, derived from Parent2.

As shown in the right-hand portion of the window, respective buttons are provided for specifying conversion of selected classes to specific structures, or to union structures. Thus, this GUI allows classes to be selected from the class hierarchy display, and specify the desired conversion rule for the selected classes. As noted just above the buttons, a "U" symbol may be used to denote classes specified for conversion to union classes, as illustrated with respect to the Parent2, ChildC, and ChildD classes. Of course, any other symbols or indicating means may be used as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions executable by a processor to:
   receive a first data flow program, wherein the first data flow program is an object oriented program comprising instances of one or more classes, wherein the first data flow diagram utilizes a plurality of classes from a class inheritance hierarchy, and wherein the first data flow program is executable to perform a first function; and
   automatically convert the first data flow program to a second data flow program, wherein the second data flow program does not include the instances of the one or more classes, and wherein the second data flow program is executable to perform the first function;
   wherein, to automatically convert the first data flow program to a second data flow program, the program instructions are executable to convert the instances of the one or more classes to a corresponding one or more structures, and wherein each of the one or more structures comprises data elements corresponding to data elements of the corresponding class and any ancestor classes;
   wherein the first data flow program comprises one or more data flow subprograms, and wherein to automatically convert the first data flow program, the program instructions are further executable to:
   a) for each subprogram invocation in the first data flow program:
      i) if the subprogram invocation is a dynamic dispatch invocation, replace the subprogram invocation with a static invocation of a class-specific implementation of the subprogram;
      ii) if an input class specified for the subprogram is an ancestor class of a corresponding child class specified as input in the invocation, perform one of:
         replace any reference to the ancestor class in inputs of the subprogram with a reference to the child class; or
         clone the subprogram, thereby generating a clone subprogram;
         replace any reference to the ancestor class in inputs of the clone subprogram with a reference to the child class; and
         replace the subprogram invocation with an invocation of the clone subprogram;
      iii) perform a) with respect to the subprogram; and
      iv) if an output class returned by the subprogram invocation is returned as an output of the data flow program and the output class returned by the subprogram invocation is a descendant class of the class specified as output of the data flow program:

replace any reference to the ancestor class in the output of the data flow program with a reference to the child class returned by the subprogram invocation; and b) for the first data flow program and each subprogram invoked directly or indirectly by the first data flow program:

replace each instance of each class with the corresponding structure for that class; and store the second data flow program on a computer memory, wherein the second data flow program is configured to be deployed to a device, and wherein the second data flow program is executable on the device to perform the first function.

2. The non-transitory computer accessible memory medium of claim 1, wherein to automatically convert the first data flow program, the program instructions are executable to:

convert any instance of a parent class constant with a value of a child class to a constant of the child class; and convert the constant of the child class to a constant of a corresponding data type.

3. The non-transitory computer accessible memory medium of claim 1, wherein the program instructions are further executable to:

determine whether every dynamic dispatch subprogram invocation in the first data flow program is resolvable to a static invocation of a class-specific subprogram at compile time; and generate an error if any dynamic dispatch subprogram invocation in the first data flow program is not resolvable to a static invocation of a class-specific subprogram at compile time.

4. The non-transitory computer accessible memory medium of claim 1, wherein the second data flow program is configured to be compiled by a compiler which does not support classes.

5. The non-transitory computer accessible memory medium of claim 1, wherein the second data flow program is configured to be deployed to a device that does not support operations necessary for support of classes.

6. The non-transitory computer accessible memory medium of claim 1, wherein the one or more classes are constrained to one or more specified categories, and wherein the program instructions are further executable to:

perform type checking to insure that the one or more classes only include classes of the one or more specified categories; and generate an error if the type checking determines that at least one of the one or more classes is not of the one or more specified categories.

7. The non-transitory computer accessible memory medium of claim 1, wherein the first data flow program is not deployable onto a programmable hardware element; and wherein the second data flow program is configured to be deployed onto a programmable hardware element.

8. The non-transitory computer accessible memory medium of claim 1, wherein the device comprises a programmable hardware element, and wherein the program instructions are further executable to:

generate a hardware configuration program based on the second data flow program, wherein the hardware configuration program is deployable to the programmable hardware element.

9. The non-transitory computer accessible memory medium of claim 8, wherein the program instructions are further executable to:

deploy the hardware configuration program onto the programmable hardware element.

10. The non-transitory computer accessible memory medium of claim 1, wherein the program instructions are further executable to:

analyze the first data flow program;

determine at least one violation of static program runtime behavior based on the analysis of the first data flow program; and generate at least one error message corresponding to the at least one violation, wherein the at least one error message includes a description of the at least one violation.

11. The non-transitory computer accessible memory medium of claim 1, wherein the program instructions are further executable to:

deploy the second data flow program to a first device, wherein the second data flow program is executable on the first device to perform the first function.

12. The non-transitory computer accessible memory medium of claim 1, wherein the first data flow program comprises a graphical data flow program, comprising a plurality of interconnected nodes that visually indicate functionality of the program.

13. The non-transitory computer accessible memory medium of claim 12, wherein the graphical data flow program comprises a block diagram and a user interface.

14. The non-transitory computer accessible memory medium of claim 1, wherein the first data flow program is executable to perform one or more of:

an industrial automation function;

a process control function;

a test and measurement function.

15. A computer-implemented method, comprising using a computer to perform:

utilizing a computer to perform:

receiving a first data flow program, wherein the first data flow program is an object oriented program comprising instances of one or more classes, wherein the first data flow diagram utilizes a plurality of classes from a class inheritance hierarchy, and wherein the first data flow program is executable to perform a first function; and automatically converting the first data flow program to a second data flow program, wherein the second data flow program does not include the instances of the one or more classes, and wherein the second data flow program is executable to perform the first function;

wherein said automatically converting the first data flow program to a second data flow program comprises converting the instances of the one or more classes to a corresponding one or more structures, wherein each of the one or more structures comprises data elements corresponding to data elements of the corresponding class and any ancestor classes;

wherein the first data flow program comprises one or more data flow subprograms, and wherein said automatically converting the first data flow program comprises:

a) for each subprogram invocation in the first data flow program:

i) if the subprogram invocation is a dynamic dispatch invocation, replacing the subprogram invocation with a static invocation of a class-specific implementation of the subprogram;
ii) if an input class specified for the subprogram is an ancestor class of a corresponding child class specified as input in the invocation, performing one of:
replacing any reference to the ancestor class in inputs of the subprogram with a reference to the child class; or
cloning the subprogram, thereby generating a clone subprogram;
replacing any reference to the ancestor class in inputs of the clone subprogram with a reference to the child class; and
replacing the subprogram invocation with an invocation of the clone subprogram;
iii) performing a) with respect to the subprogram; and
iv) if an output class returned by the subprogram invocation is returned as an output of the data flow program and the output class returned by the subprogram invocation is a descendant class of the class specified as output of the data flow program:
replacing any reference to the ancestor class in the output of the data flow program with a reference to the child class returned by the subprogram invocation; and
b) for the first data flow program and each subprogram invoked directly or indirectly by the first data flow program:
replacing each instance of each class with the corresponding structure for that class; and
storing the second data flow program on a computer memory, wherein the second data flow program is configured to be deployed to a device, and wherein the second data flow program is executable on the device to perform the first function.

16. A system, comprising:
means for receiving a first data flow program, wherein the first data flow program is an object oriented program comprising instances of one or more classes, wherein the first data flow diagram utilizes a plurality of classes from a class inheritance hierarchy, and wherein the first data flow program is executable to perform a first function; and
means for automatically converting the first data flow program to a second data flow program, wherein the second data flow program does not include the instances of the one or more classes, and wherein the second data flow program is executable to perform the first function;
wherein said automatically converting the first data flow program to a second data flow program comprises converting the instances of the one or more classes to a corresponding one or more structures, wherein each of the one or more structures comprises data elements corresponding to data elements of the corresponding class and any ancestor classes;
wherein the first data flow program comprises one or more data flow subprograms, and wherein said automatically converting the first data flow program comprises:
a) for each subprogram invocation in the first data flow program:
i) if the subprogram invocation is a dynamic dispatch invocation, replacing the subprogram invocation with a static invocation of a class-specific implementation of the subprogram;
ii) if an input class specified for the subprogram is an ancestor class of a corresponding child class specified as input in the invocation, performing one of:
replacing any reference to the ancestor class in inputs of the subprogram with a reference to the child class; or
cloning the subprogram, thereby generating a clone subprogram;
replacing any reference to the ancestor class in inputs of the clone subprogram with a reference to the child class; and
replacing the subprogram invocation with an invocation of the clone subprogram;
iii) performing a) with respect to the subprogram; and
iv) if an output class returned by the subprogram invocation is returned as an output of the data flow program and the output class returned by the subprogram invocation is a descendant class of the class specified as output of the data flow program:
replacing any reference to the ancestor class in the output of the data flow program with a reference to the child class returned by the subprogram invocation; and
b) for the first data flow program and each subprogram invoked directly or indirectly by the first data flow program:
replacing each instance of each class with the corresponding structure for that class; and
means for storing the second data flow program on a computer memory, wherein the second data flow program is configured to be deployed to a device, and wherein the second data flow program is executable on the device to perform the first function.

* * * * *